United States Patent
Gopal et al.

(10) Patent No.: US 11,012,481 B2
(45) Date of Patent: May 18, 2021

(54) SYSTEMS AND METHODS FOR SCHEDULED VIDEO CHAT SESSIONS

(71) Applicant: VIPVR, INC., New York, NY (US)

(72) Inventors: Prajit Gopal, New York, NY (US); Benjamin Kornick, Mineola, NY (US); Sandeep Peddada, Morgan Hill, CA (US); Pranav Maddi, Charlotte, NC (US); Joshua Potter, New York, NY (US)

(73) Assignee: VIPVR, INC., New York, NY (US)

( * ) Notice: Subject to any disclaimer, the term of this patent is extended or adjusted under 35 U.S.C. 154(b) by 0 days.

(21) Appl. No.: 16/792,798

(22) Filed: Feb. 17, 2020

(65) Prior Publication Data
US 2020/0186576 A1 Jun. 11, 2020

Related U.S. Application Data

(63) Continuation-in-part of application No. 16/198,328, filed on Nov. 21, 2018, now Pat. No. 10,567,450.

(51) Int. Cl.
*H04N 7/14* (2006.01)
*H04L 29/06* (2006.01)
*H04M 3/56* (2006.01)

(52) U.S. Cl.
CPC ...... *H04L 65/1083* (2013.01); *H04L 65/1069* (2013.01); *H04L 65/1073* (2013.01); *H04M 3/567* (2013.01)

(58) Field of Classification Search
CPC ...................................................... H04N 7/14
See application file for complete search history.

(56) References Cited

U.S. PATENT DOCUMENTS

| | | | | |
|---|---|---|---|---|
| 5,247,569 A * | 9/1993 | Cave | ................. | H04M 3/36 379/112.01 |
| 6,820,260 B1 * | 11/2004 | Flockhart | ......... | H04L 29/06027 370/352 |
| 6,961,418 B1 * | 11/2005 | Thygeson | ............. | H04M 3/42 379/210.01 |
| 7,564,962 B1 * | 7/2009 | O'Keeffe | ............ | H04M 3/5191 370/401 |

(Continued)

OTHER PUBLICATIONS

Natt Garun, "Facebook Live now lets you add a friend to live stream together", The Verge, May 23, 2017, https://www.theverge.com/2017/5/23/15679926/facebook-live-add-a-friend-ios-update.

*Primary Examiner* — Olisa Anwah
(74) *Attorney, Agent, or Firm* — Greenherg Traurig, LLP

(57) ABSTRACT

A computer-implemented method for facilitating a virtual meet-and-greet between a first client device, a second client device, and at least a third client device is provided. The method involves establishing a first private one-on-one video chat between the first client device and the second client device. The method also involves transmitting a request to the third client device to carry out one or more preloading operations to test the operation of one or more hardware and/or software elements of the third client device. The method further involves establishing a second private one-on-one video chat between the first client device and the third client device based at least in part on the third client device have successfully completed the preloading operations and being ready to establish a private one-on-one video chat.

19 Claims, 15 Drawing Sheets

(56) References Cited

U.S. PATENT DOCUMENTS

| | | | |
|---|---|---|---|
| 8,095,400 B2 | 1/2012 | Herde et al. | |
| 8,411,843 B1* | 4/2013 | Cyriac | H04M 3/4288 |
| | | | 379/266.06 |
| 8,866,877 B2 | 10/2014 | Calman et al. | |
| 9,374,394 B2* | 6/2016 | Kahn | G06Q 30/06 |
| 2006/0050864 A1* | 3/2006 | Shaffer | H04M 3/523 |
| | | | 379/265.02 |
| 2011/0252340 A1 | 10/2011 | Thomas | |
| 2012/0268553 A1 | 10/2012 | Talukder | |
| 2013/0110570 A1* | 5/2013 | Ament | G06Q 10/1093 |
| | | | 705/7.19 |
| 2013/0304575 A1 | 11/2013 | Fetyko | |
| 2014/0104369 A1* | 4/2014 | Calman | H04M 3/5238 |
| | | | 348/14.08 |
| 2014/0112333 A1* | 4/2014 | Oberle | H04M 3/42374 |
| | | | 370/352 |
| 2014/0226809 A1* | 8/2014 | King | H04M 3/5238 |
| | | | 379/265.11 |
| 2014/0348316 A1* | 11/2014 | Berger | H04M 3/5231 |
| | | | 379/210.01 |
| 2016/0005135 A1 | 1/2016 | Bokestad | |
| 2017/0324784 A1* | 11/2017 | Taine | H04L 51/32 |

* cited by examiner

SYSTEMS AND METHODS FOR SCHEDULED VIDEO CHAT SESSIONS

CROSS-REFERENCE TO RELATED APPLICATION

This application claims priority to and is a continuation-in-part of U.S. patent application Ser. No. 16/198,328, filed Nov. 21, 2018, the entirety of which is incorporated herein by reference.

FIELD OF THE DISCLOSURE

The present embodiments relate to video chat systems and methods. In particular, the present embodiments relate to systems and methods for performing reliable, sequentially scheduled audiovisual chat systems.

BACKGROUND

The proliferation of smartphones, tablets, laptops, and other computing devices has led to an increased number of users with Internet-connected, camera-equipped, and microphone-equipped devices. These devices—together with the development and ready availability of videotelephony—have enabled people to engage in virtual real-time communication by simultaneously exchanging live video and audio data between two devices.

Videoconferencing is a common application of videotelephony technology, in which a group of individuals can participate in an organizational meeting. The rise of videoconference services has enabled some organizations to allow their employees to work remotely, while still being able to engage in group meetings. Another application of this technology, often referred to as "video calling," has extended traditional audio-only telephone calls to also include live video transmission.

With the advent of the Internet, celebrities, artists, influencers, and other public figures are increasingly engaging with their fans, supporters, and constituents through digital platforms, such as social media. Traditionally, such famous individuals have engaged with members of the public through organized in-person events (e.g., public appearances, backstage passes, public receptions, press events, etc.).

These types of public events can be difficult and expensive to organize. Fans or other individuals often have to travel to the geographic location of the public event, which may preclude some individuals from attending due to timing or cost constraints. Additionally, such public events often require security personnel to ensure the safety of the public figure. These challenges result in fans being unable to meet public figures, and in public figures electing to forgo attending such public events in the interest of their safety and convenience.

Thus, an object of the present invention is to provide a platform to allow celebrities, artists, influencers, and other public figures to digitally engage with their fans, supporters, and constituents.

In addition, telephonic or video conference meetings have typically required participants to dial-in, connect, or otherwise initiate conferencing software at a scheduled meeting time. One drawback of this system is that it relies upon each participant to call or launch the software at or before the start of the meeting. Thus, a meeting may be delayed or cancelled altogether due to participants being unavailable at the time of the call, technical difficulties in connecting to the telephonic or videoconferencing system, or the bandwidth of one or more participants being insufficient to send and receive audio and/or video data, among other possible reasons. Accordingly, it is another object of the present invention to provide a video chat system that mitigates against the potential human and technical causes for delay in joining a chat or conference, to in turn reduce the amount of time wasted by one or more other participants of the chat or conference.

SUMMARY

The various embodiments of the present techniques for systems and methods for scheduled video chat sessions have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description," one of skill in the art will understand how the features of the present embodiments provide the advantages described herein.

As technology advances, it has become increasingly commonplace for the average consumer to own a camera-equipped and microphone-equipped computing device. Smartphones, for example, frequently include front-facing cameras, which allow users to capture self-portraits (i.e., "selfies") of themselves and to engage in live video chat with others.

Additionally, the fanbases for celebrities, artists, influencers, and other public figures has become more geographically dispersed than ever before. Technologies such as the Internet have enabled users to consume content from their favorite musicians, artists, politicians, athletes, and other famous figures from anywhere in the world. Social media platforms have allowed users to follow the activity of their favorite celebrities, without the need to physically travel to the events of those celebrities.

Existing social media platforms offer one-way communication, in which the public figure can publish content (e.g., a text statement, a photo, a video clip, etc.) to be consumed by his or her fan base. While many of these platforms allow fans to publicly comment on and "like" posted content, the type of communication from fans toward celebrities does not simulate a more private in-person event, such as a backstage pass or "meet-and-greet" event. Additionally, existing platforms do not offer a mode of operation that facilitates two-way private communication between a celebrity and his or her fans.

In addition, celebrities, artists, influencers, or public figures may wish to reward their fans and thank them for their ongoing support. Traditional social media platforms may only feasibly enable a celebrity to publish a statement, photo, or video to his or her entire fanbase, which may be impersonal and not specifically reward that celebrity's most dedicated fans. However, individually messaging or contacting each "hardcore" fan may be a challenge to organize, schedule, and manage using existing platforms and frameworks. For example, celebrity wanting to reward his or her dedicated fans with brief one-on-one conversations would typically have to contact each fan separately, arrange a time to chat, and then manually call each fan separately at a scheduled date and time. Such an arrangement may be infeasible, or might otherwise involve significant resources to arrange and organize using traditional social media or video telecommunication platforms.

One aspect of the present embodiments includes the realization that neither typical videotelephony systems nor social media platforms provide a comprehensive way for celebrities, artists, influencers and other public figures to directly and digitally engage with fans, supporters, and other constituents. Indeed, while celebrities, artists, influencers, and other public figures may directly engage with their fans or supporters on social media via text communications, these communications methods may not regularly encourage direct engagement between a public figure and his or her fans. Accordingly, one aspect of the present embodiments is the ability of individual users, who may be fans and supporters or certain celebrities, artists, and other public figures, to earn virtual currency rewards in exchange for sharing social media content posted by those celebrities, artists, and other public figures to the feeds of the individual users' own social media accounts. The individual users can eventually cash in those virtual currency rewards for a virtual meeting, or for a chance to win a virtual meeting, with the celebrity, artist, influencer, or other public figure. Thus, embodiments of the present invention provide a system in which one individual (e.g., a celebrity, artists, or other public figure) can engage in a series of sequential, one-on-one private video chats with a set of other individuals (e.g., fans, supporters, or other constituents). Each private video chat session may begin and end automatically according to a predetermined timetable or schedule, which simplifies the process for both the famous individual and their supporters. In this manner, each fan has a chance to privately interact with the celebrity and engage in a one-on-one conversation for a predetermined period of time. Such a scheduled, timetable-based video chat session between one person and a set of other persons may be referred to herein as a "virtual meet-and-greet."

Typically, video conferencing platforms rely on each user to install and set up software on his or her device, launch that software at or before a scheduled meeting time, and to leverage a data connection (e.g., Wi-Fi, cellular data, etc.) having an adequate bandwidth and stability to support a live video teleconference. Sometimes, a meeting participant may not have installed or set up the software on his or her device in time for a scheduled meeting. In addition, a meeting participant may have a slow data connection or poor cellular service that may lead to interruptions in the meeting, or otherwise be unable to support a two-way live video chat. Furthermore, many operating systems do not permit the execution of software routines while a program is not open or running, which prevents a user's device from automatically initiating a video conference at a scheduled meeting time.

Another aspect of the present embodiments includes the realization that, in the context of a virtual meet-and-greet, a failure of a fan or meeting participant to be on time, have the meet-and-greet software application installed and configured, and have a sufficiently fast and stable data connection would normally cause the celebrity or public figure to sit idly until the next fan or meeting participant's scheduled meeting time. For example, a pre-arranged meeting may schedule two-minute back-to-back slots for fifteen fans to each have a brief meet-and-greet with a celebrity. If the first scheduled fan fails to meet the conditions necessary to begin the meet-and-greet, then the celebrity would have to wait out the two-minute period until the second fan's allotted time slot. Even if the celebrity wanted to advance the meeting and skip over the absent fan, the second fan may not be prepared to join the meet-and-greet earlier than his or her scheduled time.

Accordingly, another aspect of the present embodiments is to provide a system that mitigates human and technical errors to enable a dynamically-scheduled meeting that reduces or eliminates what might otherwise have been idle time for the celebrity, influencer, or public figure. For example, embodiments of the present disclosure may perform a "preloading" operation, in which a user may be pinged, called, notified, or otherwise prompted for confirmation that the meet-and-greet software is open some amount of time prior to his or her scheduled time slot. The preloading operation may perform additional checks, such as whether the camera and microphone are operational, test the quality of the data connection, and, in some implementations, check for certain conditions that would preclude the user from a meet-and-greet (e.g., if the user's environment is too loud to hear, verify that the user is a person and not a bot, ensure that the user is adequately clothed, and/or verify that one or more conditions under the software's terms of use are not being violated). If the user passes the various preloading conditions, then the system may continue to connect him or her with the celebrity or other public figure at a scheduled time, or as soon as the celebrity or public figure is ready. However, if a given user fails to meet the preloading conditions, then the system may skip over that user and begin performing the preloading operation on other users in the queue until an available user is confirmed. In some cases, the skipped user or users may be placed at the end of the queue, such that they may be able to re-attempt the preloading verification and participate in a meet-and-greet toward the end of the celebrity's or public figure's meet-and-greet session. In this manner, the meet-and-greet session may appear to be substantially seamless from the celebrity's or public figure's perspective, with minimal delays and potentially ending early if one or more participants fail to satisfy the preloading requirements.

In addition to the preloading operation, the system may keep track of a queue of scheduled participants and notify participants if their time slot changes (e.g., as a result of other participants failing to meet the preloading conditions and being skipped or moved to the end of the queue). For example, in a queue of fifteen participants, the second participant may fail the preloading operation, causing all subsequent participants' time slots being moved up to a time that is sooner than was initially scheduled. Upon such an event, the system may notify the upcoming participants that their time slot has been changed. Alternatively and/or additionally, the system may notify the user a predetermined amount of time prior to their time slot (e.g., five minutes before the allotted time slot)—which notification may be pushed to the user dynamically if participants ahead of that user are removed from the queue. In various implementations, the order in which the participant meet-and-greet slots are arranged may change throughout the course of a meet-and-greet session, either automatically or as a result of inputs from the user and/or celebrity (e.g., a user cancelling his or her own time slot, the celebrity choosing not to chat with a particular user, etc.). Moreover, the specific start and end times for each time slot may vary dynamically throughout a meet-and-greet session (e.g., due to delays or breaks by the celebrity or public figure, short durations of idle time if multiple consecutive participants fail the preloading check, and/or for other various reasons).

In some instances, the preloading operations may include transmitting audio and/or video from a participant's device to one or more other devices for some period of time prior to the start of the meet-and-greet. For example, a short video clip may be transmitted to a server, which may determine (e.g., via human review, image analysis, etc.) whether the participant's video contains images that violate one or more rules (e.g., prohibited symbols, nudity or inappropriate attire, etc.). Alternatively and/or additionally, a video clip may be transmitted to the celebrity or public figure's device for him or her to decide whether or not to initiate the call.

In a first aspect, a computer-implemented method for facilitating a virtual meet-and-greet between a first client device, a second client device, and at least a third client device is provided. The computer-implemented method involves establishing a first private one-on-one video chat between the first client device and the second client device by (i) causing transmission of a first audiovisual stream from the first client device to the second client device and (ii) simultaneously causing transmission of a second audiovisual stream from the second client device to the first client device during a first period of time. The computer-implemented method also involves transmitting, by a backend server, a request to the third client device to establish a data connection between the backend server and the third client device during the first period of time. The computer-implemented method further involves receiving, at the backend server, a message from the third client device indicative of a state of the third client device after establishing the data connection between the backend server and the third client device. Additionally, the computer-implemented method involves establishing a second private one-on-one video chat between the first client device and the third client device by (i) causing transmission of the first audiovisual stream to the third client device and (ii) simultaneously causing transmission of a third audiovisual stream from the third client device to the first client device based at least in part on the state of the third client device indicating that the third client device is ready to establish a private one-on-one video chat.

In an embodiment of the first aspect, the computer-implemented method further involves transmitting, by the backend server, instructions to the third client device to perform one or more preloading operations based at least in part on the state of the third client device indicating that the third client device is connected to a virtual waiting room associated with the virtual meet-and-greet. In this embodiment, the successful performance of the one or more preloading operations causes the third client device to be in a state of readiness to establish a private one-on-one video chat.

In an embodiment of the first aspect, transmitting, by the backend server, the request to the third client device to establish the data connection between the backend server and the third client device involves determining that a virtual meet-and-greet software application is running on the third client device. In this embodiment, the computer-implemented method also involves transmitting an invitation to the third client device to initiate a Voice over Internet Protocol (VoIP) call between the third client device and the backend server based on determining that the virtual-meet-and-greet software application is running on the third client device. In this embodiment, the computer-implemented method further involves establishing the VoIP call as the data connection between the backend server and the third client device upon receiving an acknowledgment from the third client device.

In some implementations according to the above embodiment, the computer-implemented method may also involve determining that the backend server is receiving audiovisual data from the third client device during the VoIP call between the third client device and the backend server. In these implementations, the message from the third client device, which is indicative of a state of the third client device, may include data transmitted during the VoIP call indicating that a camera of the third client device and a microphone of the third client device are operational.

In these implementations, the method may also involve determining that the audiovisual data from the third client device does not include images representative of at least one predetermined category of objects, where the at least one predetermined category of objects are prohibited in the virtual meet-and-greet. The message from the third client device may indicate that the third client device is ready to establish a private one-on-one video chat is determined based at least in part on the audiovisual data from the third client device not including images representative of the at least one predetermined category of prohibited objects.

In an embodiment of the first aspect, transmitting, by the backend server, the request to the third client device to establish the data connection between the backend server and the third client device may also involve determining that the backend server is receiving audio data from the third client device during the VoIP call between the third client device and the backend server. The computer-implemented method may further involve determining, by the third client device, that a camera of the third client device is operational and accessible by the virtual meet-and-greet software application. The message from the third client device may be indicative of a state of the third client device comprises data transmitted during the VoIP call indicating the microphone of the third client device is operational and data indicative that the camera of the third client device is operational and accessible by the virtual meet-and-greet software application.

In an embodiment of the first aspect, transmitting, by the backend server, the request to the third client device to establish the data connection between the backend server and the third client device may include determining that a virtual meet-and-greet software application is not running on the third client device and, based on determining that the virtual meet-and-greet software application is not running on the third client device, transmitting a push notification to the third client device, wherein interacting with the push notification causes the third client device to launch the virtual meet-and-greet software application.

In a second aspect, computer-implemented method for facilitating a virtual meet-and-greet between a first client device, a second client device, a third client device, and a fourth client device is provided. The computer-implemented method involves establishing a first private one-on-one video chat between the first client device and the second client device by (i) causing transmission of a first audiovisual stream from the first client device to the second client device and (ii) simultaneously causing transmission of a second audiovisual stream from the second client device to the first client device during a first period of time. The computer-implemented method also involves transmitting, by a backend server, a request to the third client device to establish a data connection between the backend server and the third client device during the first period of time. The computer-implemented method also involves determining that no response to the request was received from the third client device within a second duration of time. The computer-implemented method further involves transmitting, by the backend server, a request to the fourth client device to establish a data connection between the backend server and the fourth client device. Additionally, the computer-implemented method involves receiving, at the backend server, a message from the fourth client device indicative of a state of the fourth client device after establishing the data connection between the backend server and the fourth client device. Further, the computer-implemented method involves establishing a second private one-on-one video chat between the first client device and the fourth client device after the first private one-on-one video chat ends by (i) causing transmission of the first audiovisual stream to the fourth client device and (ii) simultaneously causing transmission of a fourth audiovisual stream from the fourth client device to the first client device based at least in part on the state of the fourth client device indicating that the fourth client device is ready to establish a private one-on-one video chat.

In an embodiment of the second aspect, the request to the third device is a first request, and the computer-implemented method also involves transmitting, by the backend server, a second request to the third client device to establish a data connection between the backend server and the third client device during the second private one-on-one video chat. In this embodiment, the method also involves receiving, at the backend server, a message from the third client device indicative of a state of the third client device after establishing the data connection between the backend server and the third client device. In this embodiment, the method may further involve establishing a third private one-on-one video chat between the first client device and the third client device after the second private one-on-one video chat ends by (i) causing transmission of the first audiovisual stream to the third client device and (ii) simultaneously causing transmission of a third audiovisual stream from the third client device to the first client device based at least in part on the state of the third client device indicating that the third client device is ready to establish a private one-on-one video chat.

In an embodiment of the second aspect, the request to the third device is a first request, and the method further involves determining that the third client device is connected to a virtual waiting room associated with the virtual meet-and-greet during the second private one-on-one video chat. In this embodiment, the method also involves transmitting, by the backend server, instructions to the third client device to perform one or more preloading operations, where successful performance of the one or more preloading operations causes the third client device to be in a state of readiness to establish a private one-on-one video chat. In this embodiment, the method also involves determining that the third client device is ready to establish a private one-on-one video chat. In this embodiment, the method also involves establishing a third private one-on-one video chat between the first client device and the third client device after the second private one-on-one video chat ends by (i) causing transmission of the first audiovisual stream to the third client device and (ii) simultaneously causing transmission of a third audiovisual stream from the third client device to the first client device based at least in part on the state of the third client device indicating that the third client device is ready to establish a private one-on-one video chat.

In an embodiment of the second aspect, the backend server stores an initial order in which to connect at least the second, third, and fourth client devices to the first client device. In this embodiment, determining that no response to the request was received from the third client device within the second duration of time causes the initial order to be modified by placing the third client device after the fourth client device.

In an embodiment of the first aspect, the method further involves transmitting, by the backend server, instructions to the fourth client device to perform one or more preloading operations, wherein successful performance of the one or more preloading operations causes the fourth client device to be in a state of readiness to establish a private one-on-one video chat based at least in part on the state of the fourth client device indicating that the fourth client device is connected to a virtual waiting room associated with the virtual meet-and-greet.

In an embodiment of the second aspect, transmitting, by the backend server, the request to the third client device to establish the data connection between the backend server and the third client device may involve (i) determining that a virtual meet-and-greet software application is not running on the third client device and (ii) transmitting a push notification to the third client device, wherein interacting with the push notification causes the third client device to launch the virtual meet-and-greet software application based on determining that the virtual meet-and-greet software application is not running on the third client device.

In an embodiment of the second aspect, determining that no response to the request was received from the third client device within a second duration of time may involve operations including determining that, after the second duration of time has elapsed, the third client device has not launched the virtual meet-and-greet software application. The operations may also include determining that a virtual meet-and-greet software application is not running on the third client device. The operations may further include transmitting a push notification to the third client device, wherein interacting with the push notification causes the third client device to launch the virtual-meet-and-greet software application based on determining that the virtual-meet-and-greet software application is not running on the third client device.

In a third aspect, system for digitally engaging a celebrity with fans through virtual meetings is provided. The system includes a first client device associated with the celebrity that is operable to participate in a virtual meet-and-greet that involves a series of private one-on-one video chats with a set of fans. The first client device includes at least a display, a camera, and a microphone. The system also includes one or more second client devices associated with the set of fans, each of the one or more second client devices being operable to participate in one of the private one-on-one video chats with the celebrity during the virtual meet-and-greet, each of the private one-on-one video chats being non-overlapping and occurring substantially sequentially, the one or more second client devices each including at least a display, a camera, and a microphone. The system further includes a backend server configured to facilitate the virtual meet-and-greet between the celebrity and the set of fans by performing operations. The operations include determining an initial order for the set of fans to participate in the virtual meet-and-greet. The operations also include establishing a private one-on-one video chat between the first client device and a respective second client device associated with a first fan of the set of fans based on the initial order. The operations further include transmitting instructions to a respective second client device associated with a next fan from the set of fans based on the initial order to perform one or more preloading operations to verify that the respective second client device of the next fan is ready to establish a private one-on-one video chat before the end of the current private one-on-one video chat. If the respective second client device associated with the next fan successfully performed the one or more preloading operations, establish a private one-on-one video chat between the first client device and the respective second client device. If the respective second client device associated with the next fan did not successfully perform the one or more preloading operations, modify the initial order by moving the next fan to a later position and repeat the operation of transmitting instructions to a respective second client device associated with a fan following the next fan in the modified initial order.

In an embodiment of the third aspect, where the backend server is further configured to provide, during the virtual meet-and-greet, a virtual waiting room into which some of the one or more second client devices connect before establishing the private one-on-one video chat with the first client device. In this embodiment, the one or more second client devices are further configured to display one or more user interface elements representative of a waiting room while connected to the virtual waiting room.

In an embodiment of the third aspect, the one or more user interface elements comprises a countdown timer that estimates the amount of time before establishing the private one-on-one video chat with the first client device, based in part on the initial order.

In an embodiment of the third aspect, the one or more user interface elements includes a representation of a number of fans ahead of the respective fan associated with the respective second client device.

In an embodiment of the third aspect, the backend server is further configured to provide, within the virtual waiting room, a chat box with which each of the one or more second client devices connected to the virtual waiting room can enter text chat viewable by the other one or more second client devices.

In an embodiment of the third aspect, the backend server is further configured to provide, within the virtual waiting room, a virtual button that, when pressed, causes the respective second client device to perform at least one of the one or more preloading operations to verify that the respective second client device is ready to establish a private one-on-one video chat.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

The various embodiments of the present techniques for systems and methods for scheduled video chat sessions now will be discussed in detail with an emphasis on highlighting the advantageous features. These embodiments depict the novel and non-obvious techniques for systems and methods for scheduled video chat sessions shown in the accompanying drawings, which are for illustrative purposes only. These drawings include the following figures, in which like numerals indicate like parts.

DETAILED DESCRIPTION

Figure 1:
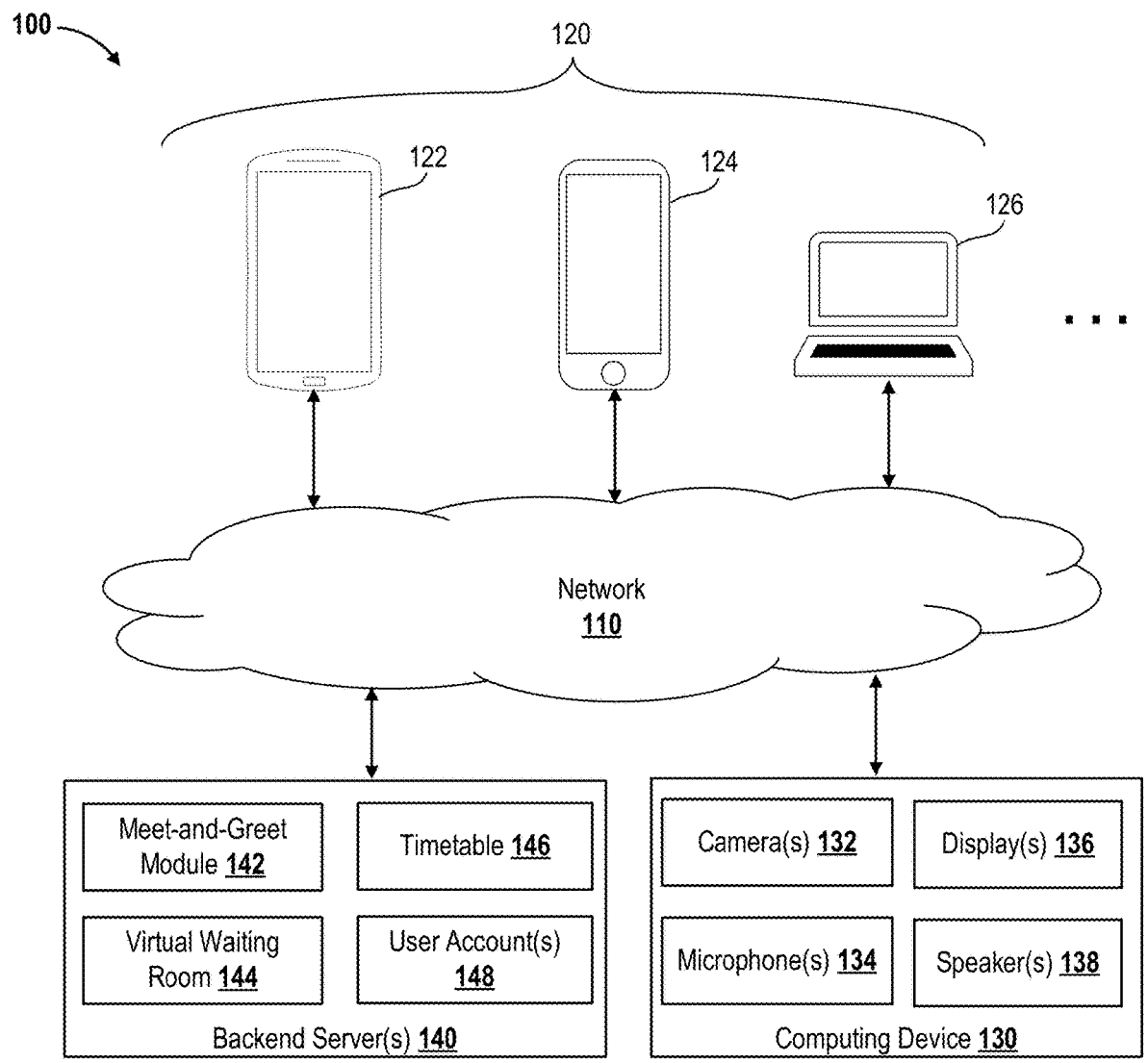
FIG. 1 is a schematic diagram of an example system for carrying out scheduled video chat sessions, according to various aspects of the present disclosure.

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

The ubiquity of computing devices has enabled individuals to digitally communicate with each other over vast distances. With the emergence of social media, users are now able to follow celebrities, musicians, influencers, and other public figures by consuming the content they post on those platforms. However, most of these platforms provide a primarily unidirectional mode of communication. Celebrities can publish content (e.g., text statements, hyperlinks, photos, videos, etc.), which their followers can view, like, and comment on. However, these platforms do not provide a framework for celebrities to directly engage with their fans in a structured manner.

Videotelephony services, such as videoconferencing software and video calling, provide one potential alternative suitable means of communication by which celebrities, artists, influencers, and other public figures may engage with their constituents. Video calling can be effective for "one-to-one" communication, in which one person directly calls another person. However, this type of service often requires that at least one person has the direct contact information of the other person (e.g., a phone number), which is typically provided only to trusted parties and close friends, family, or colleagues. Videoconferencing software, on the other hand, can be effective for "many-to-many" communication, whereby many individuals join a collective conference, each being able to observe and participate in a group discussion or meeting. Such software, however, cannot be used if two individuals among the group wish to have a private discussion separate from the group meeting. Furthermore, videoconferencing typically provides each participant the freedom to chime into a discussion which, coupled with latency delays in audiovisual transmissions, frequently leads to users talking over one another and hindering the communication. Thus, while each of these communication methods has advantages for enabling direct engagement and communication between celebrities, artists, influencers, and other public figures and their fans, supporters and constituents, each method has its drawbacks for facilitating such engagement and communication.

Embodiments of the present disclosure solve these problems by providing a structured videotelephony platform that is efficient and effective for achieving "one-to-many" communication. An example technique facilitates a virtual "meet-and-greet" between one person (e.g., a celebrity, athlete, musician, public figure, interviewer, etc.) and two or more individuals (e.g., fans, supporters, interviewees, etc.) according to a timetable or schedule. A server determines the timetable or schedule for the virtual meet-and-greet, which designates a set of timeslots for each of the two or more individuals. During each time slot, the server exchanges audiovisual data between the computing device of the scheduled individual and the computing device of the person conducting the meet-and-greet, thereby providing a private, one-on-one video chat between the person and that individual for a predetermined period of time. At the conclusion of each time slot, the server automatically stops the audiovisual data exchange between the computing devices of the scheduled individual and the person conducting the meet and greet. Then, at the start of the proceeding time slot (which may be at the same time as, or after the conclusion of, the preceding time slot), the server begins exchanging audiovisual data between the computing devices of the next scheduled individual and the person conducting the meet-and-greet.

In this manner, the public figure conducting the meet-and-greet simply launches the application on his or her smartphone, tablet, or other computing device, and joins the virtual meet-and-greet session. The server, in accordance with a predetermined timetable, automatically connects and disconnects the participants (e.g., two-minute time slots for each participant) over the course of the virtual meet-and-greet. The public figure conducting the meet-and-greet need not have the participants' contact information, and does not need to manually call (or accept calls) from the participants. Thus, the privacy of the public figure conducting the meet-and-greet is preserved, while still enabling that public figure to meet his or her fans and supporters. Likewise, fans and supporters are given the opportunity to meet their favorite celebrities, artists, and other public figures without having to travel significant distances, spend significant sums, obtain backstage passes or otherwise be invited to private in-person events.

Time slots may be allocated in association with particular user accounts. For example, a given time slot may represent a private one-on-one video chat session between a fan's user account and a celebrity's user account. The fan and/or celebrity may log in to their respective accounts on any suitable device and conduct the private video chat.

The system may include software applications that are executed on the computing devices of the fans and the celebrities, which at least partially facilitate the virtual meet-and-greet. For instance, an application on a fan's mobile device (or other computing device) might include user interfaces for obtaining a virtual meet-and-greet timeslot with a celebrity, displaying the live video feed of the celebrity during the virtual meet-and-greet, and/or displaying other aspects of the platform described herein. Likewise, an application of a celebrity's mobile device (or other computing device) might include user interfaces for publishing a window of time for a virtual meet-and-greet, displaying the live video feed of fans during virtual meet-and-greets, and/or displaying other aspects of the platform described herein. The application may also include software that exchanges information with a backend server, and that facilitates the transmission and/or reception of live audio-visual data.

The virtual "meet-and-greet" technique disclosed above may form a part of a digital service, platform, or experience. In some implementations, a platform or system according to the present disclosure may provide video chat experiences other than virtual meet-and-greets. For instance, the virtual meet-and-greet may be one of many "VIP" (Very Important Person) experiences, such as a "Green Room" (e.g., five-minute live group video chat with the celebrity and a few participants), a "Studio" meeting (e.g., a ten-minute live video chat to make and discuss music with an artist), and a "Press Room" (e.g., a celebrity answering fan-submitted questions live and broadcasting that video chat to a set of viewers), among other possible experiences.

In some embodiments, the system provides a virtual waiting room for fans awaiting their virtual meet-and-greet time slot. The virtual waiting room may be presented as a user interface on the computing devices of the fans, and may include elements such as a countdown timer (specific to each user representing an amount of time remaining prior to their meet-and-greet time slot), a chat function to allow other waiting fans to engage in public text communication with each other, and/or other aesthetic features or functions (e.g., option buttons for configuring the meet-and-greet experience, buttons for testing Internet connectivity, etc.).

In additional embodiments, a virtual meet-and-greet between a fan and a celebrity may involve capturing a virtual "selfie" containing both the fan and the celebrity. The user interface may immediately juxtapose a portion of the live video of the fan with a portion of the live video of the celebrity, according to a particular selfie "template." The selfie templates may be designed to provide the appearance of the fan and the celebrity being in the same physical location, akin to taking a photograph together in person. In some implementations, the selfie templates may place portions of the live video of the celebrity and the fan into a digital environment (e.g., on a stage, in a backroom, on location in an outdoor nature environment, etc.).

The system may store user account information associated with the users of the platform. For example, a user account may link to that user's social media accounts, allowing users to directly share content from the platform on other social media platforms. Additionally, the user account information may maintain information related to the user's account as it pertains to the use of the platform. For example, the system may maintain a ledger of virtual currency quantities for each user account. A user may obtain virtual currency by performing particular actions with respect to the platform. For example, a celebrity may publish content on the platform, and the user may share that content on his or her respective social media account(s) to earn virtual currency rewards. The virtual currency may be used to purchase or enter a lottery for virtual meet-and-greet time slots or other VIP experiences. The user account information may also store data related to the user's purchased virtual meet-and-greet and/or other VIP experiences (e.g., upcoming time slots, raffle tickets purchased to be drawn for a chance to win a time slot in a virtual meet-and-greet, etc.).

In some implementations, the system may perform (or cause performance of) one or more "preloading" operations to determine whether a given user's device is ready, prepared, and able to facilitate a two-way video chat with a celebrity's, influencer's, or public figure's device. For example, before a participant's turn to join a virtual meet-and-greet session with a celebrity or public figure, a backend server may transmit a message, notification, and/or instructions to that participant's mobile device. The message, notification, and/or instructions may be received by the participant's mobile device, and interpreted by a mobile device application installed on that mobile device to begin performing one or more preloading operations. For instance, the mobile device application may check that the mobile device's microphone and camera are operational, as well as verify that the mobile device application has access to audio and video information captured by the microphone and camera. In some implementations, the mobile device application may conduct a data connection test to assess the mobile device's download speed, upload speed, and/or other aspects of the mobile device's data connection (e.g., ping, stability, variability, jitter, etc.). Once the mobile device has completed performance of the one or more preloading operations, the mobile device may transmit a message or notification to the backend server indicating that it is operational and ready to begin a virtual meet-and-greet session. However, if the mobile device fails to complete one or more preloading operations, or if the mobile device's preloading checks produce unsatisfactory results (e.g., ping exceeding a threshold ping, download and/or upload speeds are insufficiently low, etc.), then the mobile device may transmit a message or notification to the backend server indicating that it is unable or not ready to perform a virtual meet-and-greet session at that time.

If the mobile device of that particular user has successfully completed the one or more preloading operations, and the results of the preloading checks are satisfactory, then the backend server may place that mobile device in a queue or list, or otherwise store information indicating that the mobile device is "preloaded" and ready to begin a video chat. In some cases, the backend server may store metadata indicating when the preloading check was performed, the results of that preloading check, and/or other information. Once it becomes the particular user's turn for a private one-on-one video chat with the celebrity or public figure, the system may instruct the celebrity's or public figure's device to transmit an audiovisual stream to the particular user's mobile device, and instruct the particular user's mobile device to transmit an audiovisual stream to the celebrity's or public figure's device. To the extent that the state of the mobile device remains "preloaded" from the time that the preloading checks were completed, the celebrity or public figure should readily connect with the user's mobile device, with little to no interruption from the previous user's meet-and-greet session to the particular user's meet-and-greet session.

However, if the mobile device of that particular user fails one or more of the preloading operations, or if the preloading operations otherwise produce unsatisfactory results, then the backend server may change that particular user's place in the virtual line (e.g., by modifying a stored queue or list, storing information indicating that the mobile device failed the preloading checks, etc.). In some cases, failure to satisfy the preloading checks may result in the particular user's meet-and-greet slot being cancelled from that meet-and-greet session. In other cases, upon failure by the mobile device to satisfy the preloading checks, the system may move that particular user back in the virtual line (e.g., by one place, a few places, or to the end of the line). In such cases, the system may retry the preloading checks prior to that particular user's pushed-back time slot. If the mobile device fails a second preloading attempt, then the system may remove that participant from the queue and cancel his or her time slot, or may again move that user back in the virtual line. The number of preloading attempts and rescheduling of a given participant may vary, depending upon the implementation, the number of participants scheduled after the given participant, and/or the results of the preloading checks (or lack thereof), among other factors. For instance, the system may be configured such that the virtual meet-and-greet has a predetermined end time, and may attempt to reschedule a participant that missed their initially-scheduled time slot until some amount of time prior to the predetermined end time. As another example, the system may be configured to place users that are skipped for failing to satisfactorily meet a preloading check at the end of the virtual line or queue, perform a second preloading check on the initially-skipped users' devices, and remove any user from the virtual line or queue that fails to pass the second preloading check. It will be appreciated by one of ordinary skill that the particular manner in which skipped users are rescheduled and/or cancelled may vary, depending upon the particular application of the sequential video chat techniques disclosed herein.

As described herein, "preloading" generally refers to one or more tests, operations, validations, and/or verifications that are carried out by a client device and/or a backend server to determine whether a client device is capable and ready to facilitate a video chat with another client device or computing device. Some preloading operations may be performed by a client device, such as testing the operability of hardware devices, including microphones and cameras. In some cases, the preloading operations may involve testing the functionality of certain software operations, such as determining whether the operating system has granted access to the virtual meet-and-greet application to use microphones and/or cameras, checking the version of the virtual meet-and-greet application (to determine whether an update is needed), and/or performing networking tests to determine the integrity and speed of a device's data connection, among other possible operations. In some implementations, a preloading operation in which a client device's data connection is tested may involve running a data transmitting speed test between the client device and the backend server. The preloading operations may also include transmitting push notifications, text messages, phone calls, and/or other notification means to request that the user launch the virtual meet-and-greet application.

Furthermore, the terms "preloading operations," "preloading checks," and the like may generally encompass the performance of calculations, computations, or other determinations to determine the "state" or status of a particular client device. For example, if a client device successfully accesses a microphone and camera, the client device may store a flag or other indication that the hardware of the client device is accessible and operational. The client device may transmit that flag or indication in a message to the backend server, which may be used by the backend server along with other information to determine that the client device is "ready" or "preloaded." Alternatively, the client device may perform the preloading checks and, upon completion, notify the backend server that it is successfully preloaded. In various implementations, the client device may transmit quantitative and/or qualitative information related to one or more preloading operations to the backend server (e.g., data connection speeds, statistics related to the data connection, and/or other information), which may in part form the basis for the backend server's determination of whether the client device is "ready" or "preloaded." For instance, if the data connection speeds are too low to support a live video chat (e.g., if the upload and/or download speeds are below threshold data rates), the server may compare those data rates against predetermined thresholds and determine that the client device is not "ready" or otherwise indicate that preloading was performed but did not meet a set of minimum requirements to proceed with a live video call.

In some cases, "preloading operations," "preloading checks," and the like may refer to steps in which video and/or audio information captured by the client device during preloading are analyzed and determined to represent images and/or sounds that preclude the user from proceeding with a private one-on-one video chat with the celebrity or public figure. For example, certain profanity, nudity, or other content may be prohibited on the platform, and the preloading stage may be used to prevent such prohibited content from being broadcast to the celebrity or public figure (e.g., using image analysis, video analysis, object recognition, human review, etc.). In other examples, the celebrity or public figure (or a representative of that celebrity or public figure) may be given a chance to preview the transmission from a client device prior to the private one-on-one meet-and-greet with that client device's user to determine for themselves whether to initiate or decline the meet-and-greet. In such cases, a celebrity's or public figure's decision to decline the meet-and-greet may be considered a preloading failure, in that the client device did not meet the requirement of prior approval by the celebrity or public figure.

Some or all aspects of the system—including application software executed by computing devices, website interfaces, and backend servers—may collectively form the "platform" as described herein. For instance, a mobile device application may provide user interface elements and software for communicating with a backend server for the transmission and reception of data. The "platform" may refer to the combination of software and/or hardware used to carry out the techniques of the present disclosure. Alternatively, the "platform" may refer to one or more backend servers and the software executed thereon that facilitates the various operations of the present disclosure (e.g., scheduling virtual meet-and-greets, exchanging audiovisual data among devices to facilitate virtual meet-and-greets, maintaining virtual currency quantities, etc.).

Furthermore, it should be understood that any combination of elements of the platform contemplated herein may be used in various implementations, without departing from the scope of the present application. For instance, one example virtual meet-and-greet system may involve capturing a "selfie" during each private session, while another example virtual meet-and-greet system might not involve selfie capturing. The scope of the present disclosure includes all combinations of the platform features described herein.

As described herein, "celebrity" may refer to an artist, musician, athlete, politician, influencer, public figure, and/or any other individual for which a virtual meet-and-greet is arranged with respect to one or more other "fans." A "celebrity" may not necessarily be a famous person. For instance, an implementation may involve an interviewer performing successive "meet-and-greet" sessions as job interviews with prospective employees. However, the term "celebrity" may be used herein, in the interest of brevity, and does not limit the scope of the invention to any particular set of users or individuals.

As described herein, "fan" may refer to any person that likes, follows, supports, or otherwise wishes to engage with a "celebrity" through the virtual meet-and-greet platform of the present application. A "fan" may not necessarily be someone who follows the content of the "celebrity." For instance, an implementation may involve a prospective employee (the "fan") obtaining a time slot for a job interview or screening with an employer (the "celebrity"). Thus, the systems and methods of the present application are not limited to any type of individual or any specific relationship between one individual and another. The term "fan"—like the term "celebrity"—is used herein for the sake of brevity, and should be understood to refer to any individual that participates in a private one-on-one video chat session with another individual according to the techniques of the present application, in achieving a one-to-many audiovisual communication method.

As described herein, "audiovisual stream" may refer to data that encodes or is otherwise representative of recorded audio and captured images and/or video. An audiovisual stream may comprise a set of discrete packets that can be decoded and displayed on another device to reproduce substantially live video and audio on a device other than the device that captured the audiovisual data. Various encoding and/or compression techniques may be used to create and/or interpret an audiovisual stream. In some cases, audiovisual data may describe two separate data streams for the audio and video separately, which include timecode data for synchronizing the two data streams.

As described herein, a "private" video chat may refer to a substantially live video chat between two computing devices. A private video chat may, in some instances, involve two or more individuals on either computing device (e.g., multiple members of a musical group, multiple fans, etc.). Thus, "private" may not refer to a one-on-one chat between only two individuals, but instead refers to a live video chat between two devices.

As described herein, a "timetable" may refer to a data representation of a schedule for a virtual meet-and-greet or other VIP video chat experience. A timetable may include a series of time slots, each allotted to a particular fan, supporter, or constituent. Each time slot may include a start time and an end time for a private video chat session associated with a particular celebrity and a particular fan. A backend server may be configured to automatically begin exchanging audiovisual data between the particular celebrity and the particular fan at the start time of the time slot, and likewise automatically stop exchanging the audiovisual data at the end time of the time slot.

FIG. 1 is a schematic diagram of an example system 100, according to various aspects of the present disclosure. The system 100 is an example system in which aspects of the present disclosure may be performed. In this example, the system 100 includes a set of client devices 120, a computing device 130, and backend server(s) 140 that are each communicatively connected to a network 110. The network 110 may include a combination of wide area networks (WANs), such as the Internet, and local area networks (LANs). For example, each client device within the set of client devices 120 may be communicatively coupled to a cellular data connection, a Wi-Fi network, and/or another data connection, which itself is connected to the Internet.

The set of client devices 120 and the computing device 130 may communicate with each other (e.g., exchange audiovisual data streams) over the network 110. In some embodiments, the backend server(s) 140 acts as an intermediate device logically situated between the set of client devices 120 and the computing device 130. For instance, the backend server(s) 140 may receive audiovisual streams from each of the client devices 120 and the computing device 130, and control the transmission of those audiovisual streams (e.g., according to a timetable) in order to effectuate a virtual meet-and-greet between the computing device 130 and some or all of the client devices 120.

In various implementations, the network 110 may include one or more of the following: a PSTN (public switched telephone network), the Internet, a local intranet, a PAN (Personal Area Network), a LAN, a WAN, a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port or analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

Each client device of the set of client devices 120 may include a combination of processor(s), memory, data storage device(s), display(s), input devices (e.g., buttons, touchscreens, etc.), camera(s), and/or microphone(s), among other elements. The data storage device(s) of each client device of the set of client devices 120 may store thereon application data and/or instructions for execution on the processor(s) to provide an application. The application may include user interface elements and software for interacting with aspects of a client device (e.g., capture images/video from a camera, record audio from a microphone, etc.) and/or for communicating with the backend server(s) 140 (e.g., subroutines for making application programming interface (API) calls, transmitting and receiving audiovisual data, etc.).

In addition to the above, each client device of the set of client devices 120 may include a variety of other components, such as batteries, connectors, light indicators, and sensors, among other components.

The set of client devices 120 may include any type of computing device. For example, a client device 122 may be a smartphone or tablet produced by one manufacturer, whereas a client device 124 may be a smartphone or tablet produced by a different manufacturer. The client device 126 may be a laptop computer or desktop computer. As described herein, the terms "client device" and "computing device" may be used interchangeably. The set of client devices 120 may each be similar to or the same as the computing device 130.

The computing device 130 may include processor(s), memory, and data storage device(s), which collectively enable the computing device to process and store data. The computing device 130 also includes camera(s) 132, microphone(s) 134, and/or buttons, which serve as capture input devices, along with display(s) 136 and speaker(s) 138, which serve as output devices.

The camera(s) 132 may include a combination of hardware and/or software to facilitate the capture (and processing into data) of images and/or video. The camera(s) 132 may include an imager, such as a video recording sensor and/or a camera chip. In one embodiment, the camera(s) 132 may comprise a complementary metal-oxide semiconductor (CMOS) array, and may be capable of recording high definition video data. The camera(s) 132 may also include a camera processor for encoding and compression of captured images and/or video. Such a camera processor may process captured video, together with audio recorded by the microphone(s) 134, to generate audiovisual data streams suitable for wireless transmission over the network 110. The camera(s) 132 may include camera-specific memory, such as volatile memory, which may be used when data is being buffered or encoded by the camera processor.

The microphone(s) 134 may include any combination of transducers that convert pressure waves into electrical signals. The microphone(s) 134 may capture audio, which may, in some instances, be transmitted to a separate computing device or backend server. That transmitted audio may then be relayed to another computing device or client device, such as a client device of the set of client devices 120.

The display(s) 136 may be any electronic video display, such as a liquid-crystal display (LCD) or an organic light emitting diode (OLED) display. The display(s) 136 may permit the computing device 130 to show user interface elements of the platform described herein, including live video captured by a client device of the set of client devices 120. In some implementations, the display(s) 136 include embedded therein a digitizer, capacitive layer, or a resistive layer that allows the display(s) 136 to act as a touchscreen. The display(s) 136 may also include any user interface or presentation elements suitable for a smartphone and/or a portable computing device, such as a touchscreen keypad or other virtual input devices displayed on a touchscreen.

The speaker(s) 138 may include any combination of speakers or other sound-emitting devices. The speaker(s) 138 may be operable to produce a variety of sounds, such as audio from live video, notification or alert sounds, or other audible sounds.

The computing device 130 and/or the set of client devices 120 may also include both operating memory, such as random access memory (RAM), as well as data storage, such as read-only memory (ROM), hard drives, flash memory, or any other suitable memory/storage element. In some embodiments, the memory 304 may comprise a combination of magnetic, optical, and/or semiconductor memory, and may include, for example, RAM, ROM, flash drive, and/or a hard disk or drive. The processor(s) and the memory each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. The memory may store instructions for communicating with other devices, such as the client devices 120. The memory may store, for example, a program (e.g., computer program code) adapted to direct the processor(s) in accordance with the present embodiments. The instructions also may include program elements, such as aspects of an operating system. While execution of sequences of instructions in the program causes the processor(s) to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) may include any combination of hardware and/or software elements that receive user input and/or facilitate the interpretation of received input. Input device(s) may be hardware (e.g., physical buttons and switches), software (e.g., virtual buttons, sliders, etc.), or some combination thereof (e.g., software-controlled haptic feedback for simulating button clicks). In some instances, input device(s) includes a touchscreen or touch-based digitizer. Input device(s) may include a virtual keyboard or other virtual input elements as well. Regardless of the kind of input device used, the input device(s) may provide an interface through which users can interact with computing device 130 and/or the set of client devices 120 of the present application.

The backend server(s) 140 may include one or more computing devices configured to communicate with the computing device 130 and the set of client devices 120, and to carry out aspects of the virtual meet-and-greet platform of the present disclosure. The term "server" may be construed broadly to include any combination of computing devices and computerized processes that collectively provides the functionality of the virtual meet-and-greet platform and its auxiliary features (e.g., a virtual waiting room, virtual currency maintenance, etc.). The backend server(s) 140 may execute at least some of the operations described herein. Similar to the computing device 130, the backend server(s) 140 may include a combination of processor(s), memory, storage device(s), and input/output (I/O) device(s), among other possible devices. The processor(s) may execute instructions or other software to facilitate the functionality of the virtual meet-and-greet platform.

Some of software stored on and executed by the backend server(s) 140 includes the meet-and-greet module 142 and the virtual waiting room 144. The meet-and-greet module 142 may facilitate the scheduled exchange of audiovisual data streams between the computing device 130 and the set of client devices 120 according to the timetable 146. As a specific example, the timetable 146 may store a series of five-minute time slots for a particular date: a first time slot for the client device 122 from 3:00 PM to 3:05 PM, a second time slot for the client device 124 at 3:05 PM to 3:10 PM, and a third time slot for the client device 126 at 3:10 PM to 3:15 PM. In this example, the computing device 130 and the client devices 122, 124, and 126 are each transmitting a live audiovisual data stream captured by the respective device. For the purposes of this example, the computing device 130 is associated with a famous musician, and the client devices 122, 124, and 126 are fans of that musician that have secured time slots for the virtual meet-and-greet.

At 3:00 PM, the meet-and-greet module 142 begins transmitting the audiovisual stream of the client device 122 to the computing device 130, and the audiovisual stream of the computing device 130 to the client device 122. Then, at 3:05 PM, the meet-and-greet module 142 stops the audiovisual data exchange between the client device 122 and the computing device 130, and begins an audiovisual data exchange between the client device 124 and the computing device. Likewise, at 3:10 PM, the meet-and-greet module 142 stops the audiovisual data exchange between the client device 124 and the computing device 130, and begins an audiovisual data exchange between the client device 126 and the computing device. If no other time slots are scheduled, then, at 3:15 PM, the meet-and-greet module 142 stops the audiovisual data exchange between the client device 126 and the computing device, and the virtual meet-and-greet comes to an end. The meet-and-greet module 142 may include any combination of software for performing operations such as those described above.

The software stored on and executed by the backend server(s) 140 also includes the virtual waiting room 144. The virtual waiting room 144 may provide some degree of interconnectivity among the digital presences of one or more of the set of client devices 120. For example, the virtual waiting room 144 may provide a text chat functionality to the set of client devices 120 prior to their scheduled time slot during a virtual meet-and-greet with the client device 130. Continuing with the above example, the client devices 124, 126 may connect to a virtual meet-and-greet session during or before their time slots at 3:05 PM and 3:10 PM, respectively. While waiting for their scheduled time slot, the client devices 124, 126 may display a user interface representative of a waiting room. In some embodiments, the waiting room user interface includes a chat box into which the users of the client devices 124, 126 can enter and submit text chat. The virtual waiting room 144 may receive and publish the submitted text chat, such that the users of the client devices 124, 126 each observe a public text chat on their respective displays. An example virtual waiting room user interface is shown and described with respect to FIG. 4.

The timetable 146, as described above, may be a data representation of a virtual meet-and-greet schedule. In some implementations, the timetable 146 comprises a set of time slots. Each time slot may include a start datetime, an end datetime, the user account of the fan, and the user account of the celebrity, among other information. For instance, the time slot may store information associated with the particular private one-on-one video chat sessions, such as a selected selfie template to use during the selfie portion of the chat session or a predetermined question from the fan directed to the celebrity. An example depiction of the timetable 146 is shown and described with respect to FIG. 2.

The backend server(s) 140 may also be configured to store a set of user account(s) 148. Each user account may contain information related to the user's login credentials, preferences, celebrities that the user follows, virtual currency quantity, related social media accounts, and/or the user's virtual meet-and-greet time slots or other reserved VIP experiences. The virtual currency quantity associated with each user account of the user account(s) 148 may be exchanged by the user for virtual meet-and-greet time slots, or for raffle or lottery tickets for a chance to win a virtual meet-and-greet time slot, depending upon the particular implementation.

In addition to the modules and data specifically shown and described, the backend server(s) 140 may also include any additional hardware, software, and/or data for facilitating the methods and systems of the present disclosure.

Figure 2:
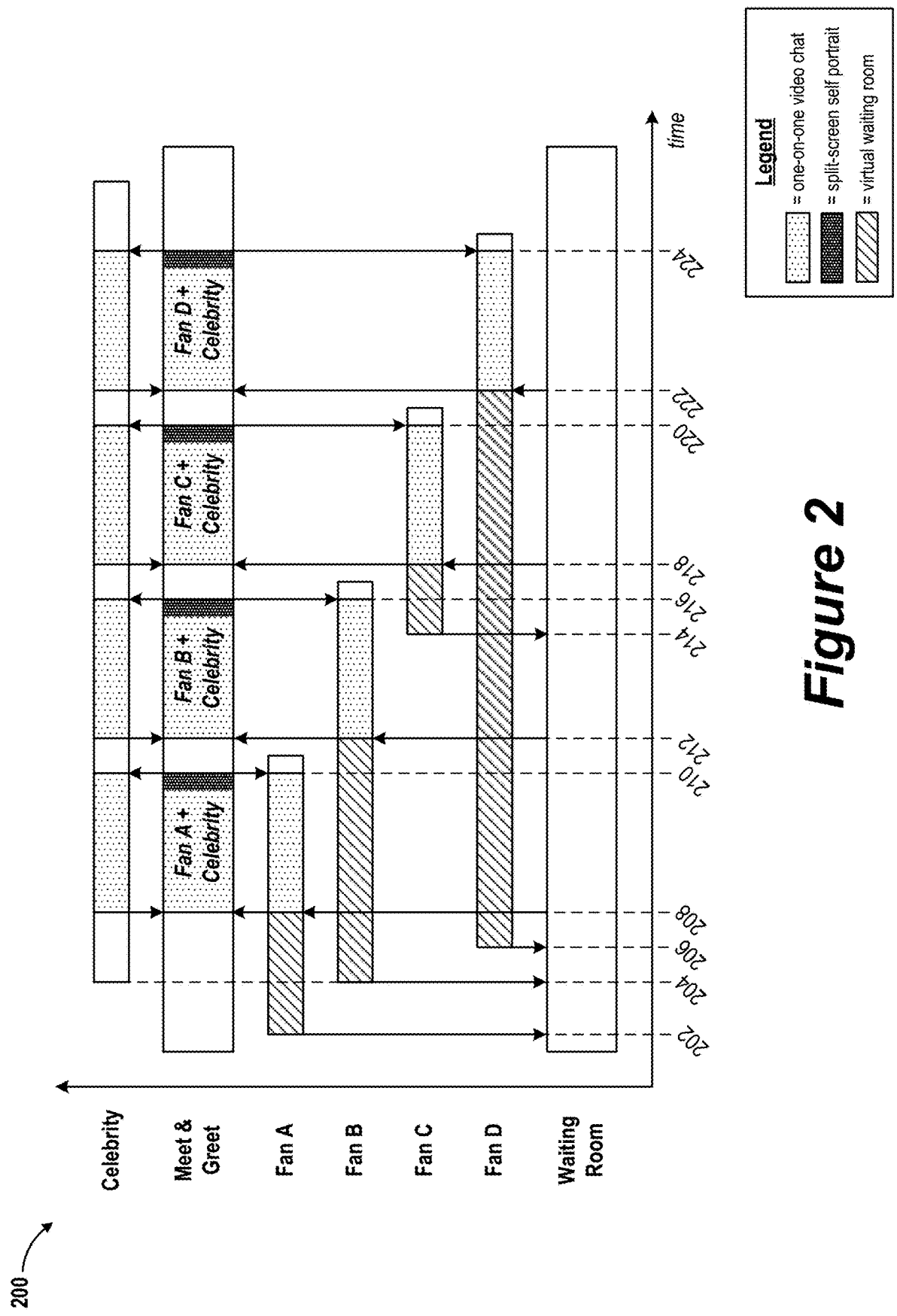
FIG. 2 is a conceptual diagram of a virtual meet-and-greet timetable, according to various aspects of the present disclosure.

FIG. 2 is a conceptual diagram 200 of an example virtual meet-and-greet timetable, according to various aspects of the present disclosure. In the diagram 200, the vertical axis represents different individuals involved in the example virtual meet-and-greet—including a Celebrity, Fan A, Fan B, Fan C, and Fan D—together with the entities involved in carrying out the virtual meet-and-greet, including a "Meet & Greet" virtual chat room and a "Waiting Room." The horizontal axis represents time, such that elements in the diagram 200 that are vertically aligned are present or occur simultaneously. Boxes represent the status of an entity within the virtual meet-and-greet, as indicated by the shading patterns within those identified in the legend in FIG. 2.

In the following description, the Celebrity and Fans A, B, C, and D are described as "connecting to," "joining," and performing other actions with respect to the virtual meet-and-greet session. For the purposes of the following explanation, these actions are performed by client devices or computing device associated with or under the control of the Celebrity or respective Fan. In some cases, a backend server or other computing device may perform an action. For instance, when a Fan connected to the virtual meet-and-greet session prior to their allotted time slot, the backend server may place the Fan's device into a particular virtual space, such as the Waiting Room.

Prior to the Celebrity and Fans joining the virtual meet-and-greet session, the Meet & Greet and Waiting Room entities are instantiated. The Meet & Greet entity represents a bidirectional private audiovisual session between the Celebrity and one of Fans A, B, C, or D. Likewise, the Waiting Room entity represents a virtual space that conveys information to the devices of one or more of Fans A, B, D or D while those Fans are "in" (e.g., communicatively connected to) the Waiting Room, such as a group text chat.

The Meet & Greet schedule or timetable between the Celebrity and Fans A, B, C, and D is as follows: a first private meet-and-greet time slot between Fan A and the Celebrity begins at time 208 and ends at time 210; a second private meet-and-greet time slot between Fan B and the Celebrity begins at time 212 and ends at time 216; a third private meet-and-greet time slot between Fan C and the Celebrity begins at time 218 and ends at time 220; and a fourth private meet-and-greet time slot between Fan D and the Celebrity begins at time 222 and ends at time 224. In this example, gaps in time exist between the first, second, third, and fourth private meet-and-greet time slot. However, this gap may be longer, shorter, or nonexistent, depending on the particular implementation.

At time 202, Fan A joins the virtual meet-and-greet session. Because Fan A joins prior to the start time 208 of the first meet-and-greet time slot, the system connects Fan A to the Waiting Room, as indicated by the downward arrow extending from the Fan A box toward the Waiting Room box. Fan A's presence in the Waiting Room is also represented by a diagonal shading pattern within the box representing Fan A, which extends from time 202 to time 208.

At time 204, both the Celebrity and Fan B join the virtual meet-and-greet session. Like Fan A, Fan B joins prior to the start time 212 of the second meet-and-greet time slot, and the system connects Fan B to the Waiting Room. The Celebrity also joins prior to the first meet-and-greet time slot with Fan A, so the system takes no action relative to the Celebrity (i.e., the system does not automatically move the Celebrity into the Waiting Room). However, in some implementation, the Celebrity may be connected to the Waiting Room to observe the group text chat, or may be presented with other information, such as the virtual meet-and-greet schedule, information about Fans A, B, C, and D, questions presented by Fans A, B, C, and D for the celebrity, and/or any other type of information. At time 204, both Fan A and Fan B are in the Waiting Room, and in that shared space they can engage in collaborative features of the Waiting Room (e.g., group text chat or other features depending on the particular embodiment).

At time 206, Fan D joins the virtual meet-and-greet session, and is connected to the Waiting Room because Fan D's fourth meet-and-greet time slot doesn't begin until time 222. Fans A, B, and D are all present within the Waiting Room at time 206.

At time 208, the first meet-and-greet time slot between Fan A and the Celebrity begins. The system may perform one or more actions in order to initiate the first private meet-and-greet video chat. In this example, the system removes Fan A from the Waiting Room and connects Fan A to the Meet & Greet entity. Likewise, the system connects the Celebrity to the Meet & Greet entity. The boxes for the Celebrity and Fan A are shaded with a dotted pattern in FIG. 2 between time 208 and time 210, which represents that they are engaged in a private meet-and-greet video chat.

While this example describes the Celebrity and Fans as being "connected to" a Meet & Greet "entity," some implementations may involve the system exchanging audiovisual streams of data between the Celebrity's device and the respective Fan's device, without an instantiated virtual object or space. The Meet & Greet entity is represented as a separate space in FIG. 2 for explanatory purposes, and may not necessarily reflect a technological implementation of the virtual meet-and-greet session.

In some embodiments, a portion of each private video chat time slot may be designated for the capturing of a "selfie." As described herein, a graphical overlay, augmented reality, artistic juxtaposition, or other arrangement of the Celebrity's and respective Fan's audiovisual streams may be presented on the devices of the Celebrity and respective Fan. This selfie template user interface may appear for some duration of time, allowing the Celebrity and Fan to make a pose or otherwise arrange themselves in the field-of-view of their cameras prior to capturing a still image or snapshot of the selfie. In this example, the selfie portion occurs toward the end of each private video chat time slot, and is representing by a dense dotted pattern within the Meet & Greet box.

At time 210, the first private meet-and-greet time slot ends, and the system disconnects Fan A and the Celebrity from the Meet & Greet entity. In this example, Fan A remains connected to the virtual meet-and-greet session for a short period of time after time 210; however, in some implementations, Fan A may be placed back into the Waiting Room or disconnected from the virtual meet-and-greet session entirely at time 210. Fans B and D remain in the Waiting Room at time 210.

Then, at time 212, Fan B is disconnected from the Waiting Room and is connected by the system with the Meet & Greet entity. The system also connects the Celebrity to the Meet & Greet entity at time 212, and the second private meet-and-greet video chat between Fan B and the Celebrity begins.

During the second private meet-and-greet video chat between Fan B and the Celebrity, Fan C joins the virtual meet-and-greet at time 214. The system places Fan C into the Waiting Room, as Fan C's third private meet-and-greet time slot doesn't begin until time 218.

At time 216, the system disconnects Fan B and the Celebrity from the Meet & Greet entity, ending the second private meet-and-greet video chat. Fans C and D remain in the Waiting Room at time 216.

Then, at time 218, the system removes Fan C from the Waiting Room, and connects Fan C and the Celebrity to the Meet & Greet entity, initiating the third private meet-and-greet video chat. At time 220, the third private meet-and-greet video chat session ends, and the system disconnects Fan C and the Celebrity from the Meet & Greet entity. At time 220, only Fan D remains in the Waiting Room.

Then, at time 222, the system removes Fan D from the Waiting Room, and connects Fan D and the Celebrity to the Meet & Greet entity, initiating the fourth (and final, in this example) private meet-and-greet video chat. At time 224, the fourth private meet-and-greet video chat ends, and Fan D and the Celebrity are disconnected from the Meet & Greet entity. The virtual meet-and-greet session effectively concludes at time 224, in this example, as no further time slots are allocated in the timetable.

At some time after time 224, Fan D and the Celebrity disconnects from the virtual meet-and-greet session. The Meet & Greet and Waiting Room entities, if instantiated as virtual "spaces," may be removed, closed, or otherwise destructed.

Embodiments of the present application are not limited to the particular arrangement and timing of operations depicted in FIG. 2. Some embodiments may vary the duration of the private meet-and-greet time slots. Fans may or may not be automatically placed in a Waiting Room (or, there may be no virtual waiting room with which to connect). Additionally, some operations may occur over a period of time, rather than at an instant in time. For example, transitioning a Fan from the Waiting Room to the Meet & Greet entity may occur over some duration of time. Further, any number of Fans may be allotted for any number of time slots. Other variations are also possible.

Each of the methods described herein, including methods 300 and 320, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 3A:
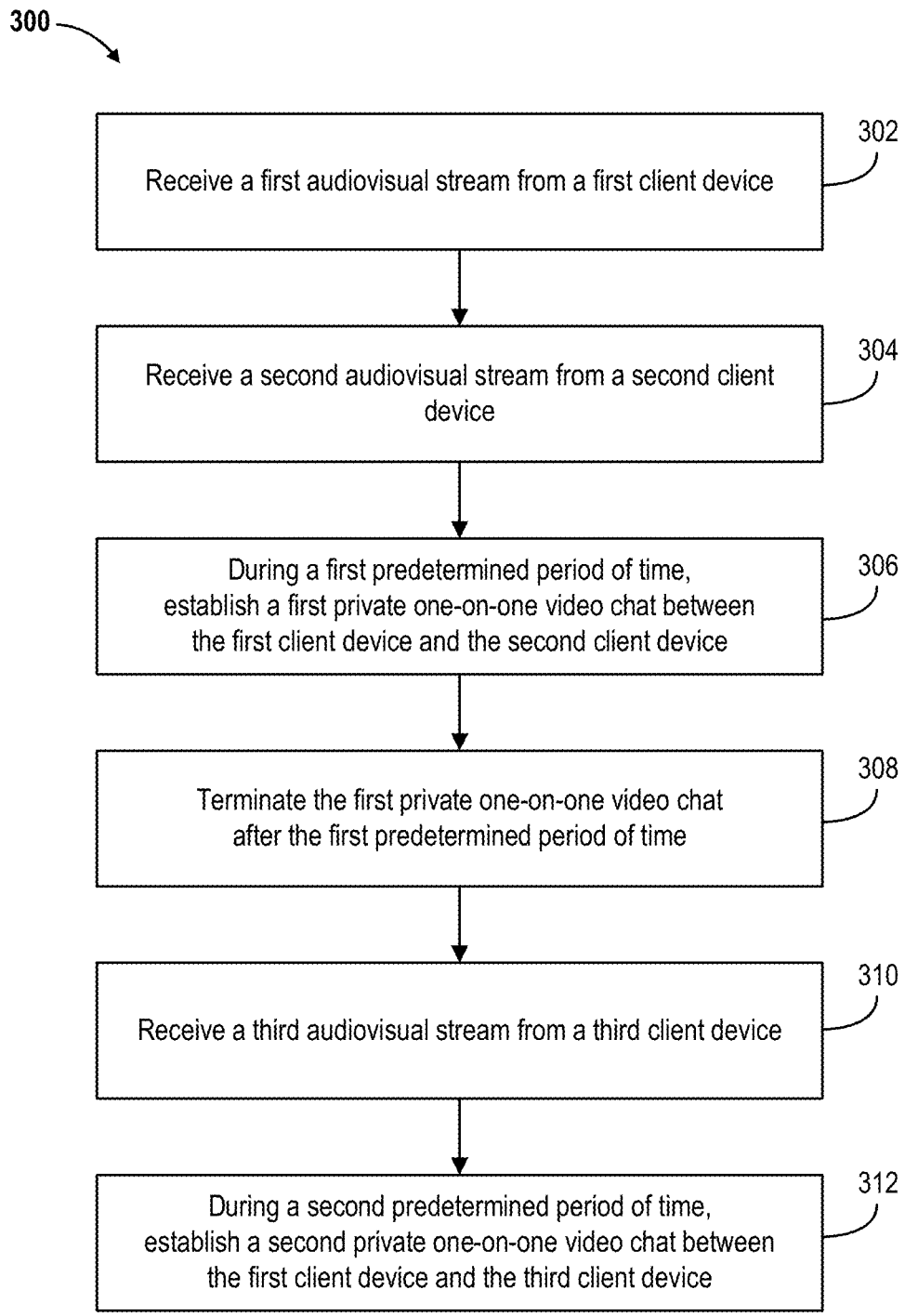
FIG. 3A is a flowchart of a method for carrying out scheduled video chat sessions, according to various aspects of the present disclosure.

FIG. 3A depicts a flowchart of method 300 for facilitating a virtual meet-and-greet, according to various aspects of the present disclosure. Some or all of the aspects of method 300 may be performed by one or more backend servers, such as the backend server(s) 140, and/or other computing devices. For the purposes of the following description, method 300 is described as being performed by a "backend server."

At block 302, the backend server receives a first audiovisual stream from a first client device. The audiovisual stream may include live video and audio captured by a camera and microphone of the first client device. The first audiovisual stream may be initially received when the first client device connects to a virtual meet-and-greet session. Likewise, at block 304, the backend server receives a second audiovisual stream from a second client device. For the purposes of explanation, the first client device is associated with a celebrity, while the second and third client devices are associated with fans of that celebrity.

At block 306, the backend server establishes a first private one-on-one video chat between the first client device and the second client device during the first predetermined period of time. The first predetermined period of time may be a time slot within a timetable, as described above. Establishing the private video chat may involve, for example, the backend server forwarding or transmitting the first audiovisual stream to the second client device, and forwarding or transmitting the second audiovisual stream to the first client device. The backend server may begin this exchange of audiovisual streams on or after the beginning of the first predetermined period of time.

Then, at block 308, the backend server terminates the first private one-on-one video chat after the expiration of the first predetermined period of time. The backend server may, for example, discontinue transmitting the first and second audiovisual streams to the second and first client devices, respectively. In some implementations, the backend server may transmit instructions to the respective devices to stop capturing and transmitting audiovisual data. Regardless of the particular technique employed, the first and second client devices become effectively disconnected from the private one-on-one video chat session.

At block 310, the backend server receives a third audiovisual stream from a third device. The backend server may receive the third audiovisual stream before, during, or after the first predetermined period of time. Although the blocks 302-312 are shown sequentially, it should be understood that the steps of the method 300 may occur in a different order, and/or some of the steps may be performed simultaneously with other steps.

Then, at block 312, the backend server establishes a second private one-on-one video chat between the first client device and the third client device during a second predetermined period of time. The second predetermined period of time does not overlap with the first predetermined period of time. In some implementations, the end of the first predetermined period of time is the same or substantially the same as the start of the second predetermined period of time. In other implementations, a "break" period of time exists between the first predetermined period of time and the second predetermined period of time. Such a break period between private one-on-one video chat sessions may accommodate the time involved in establishing the exchange of audiovisual information, and/or allow the user of the first client device to take short breaks in between each successive meet-and-greet chat session.

Although only three client devices are shown and described as participating in two separate private one-on-one video chat sessions, the method 300 may extend to any number of client devices and/or any number of private one-on-one video chat sessions.

Figure 3B:
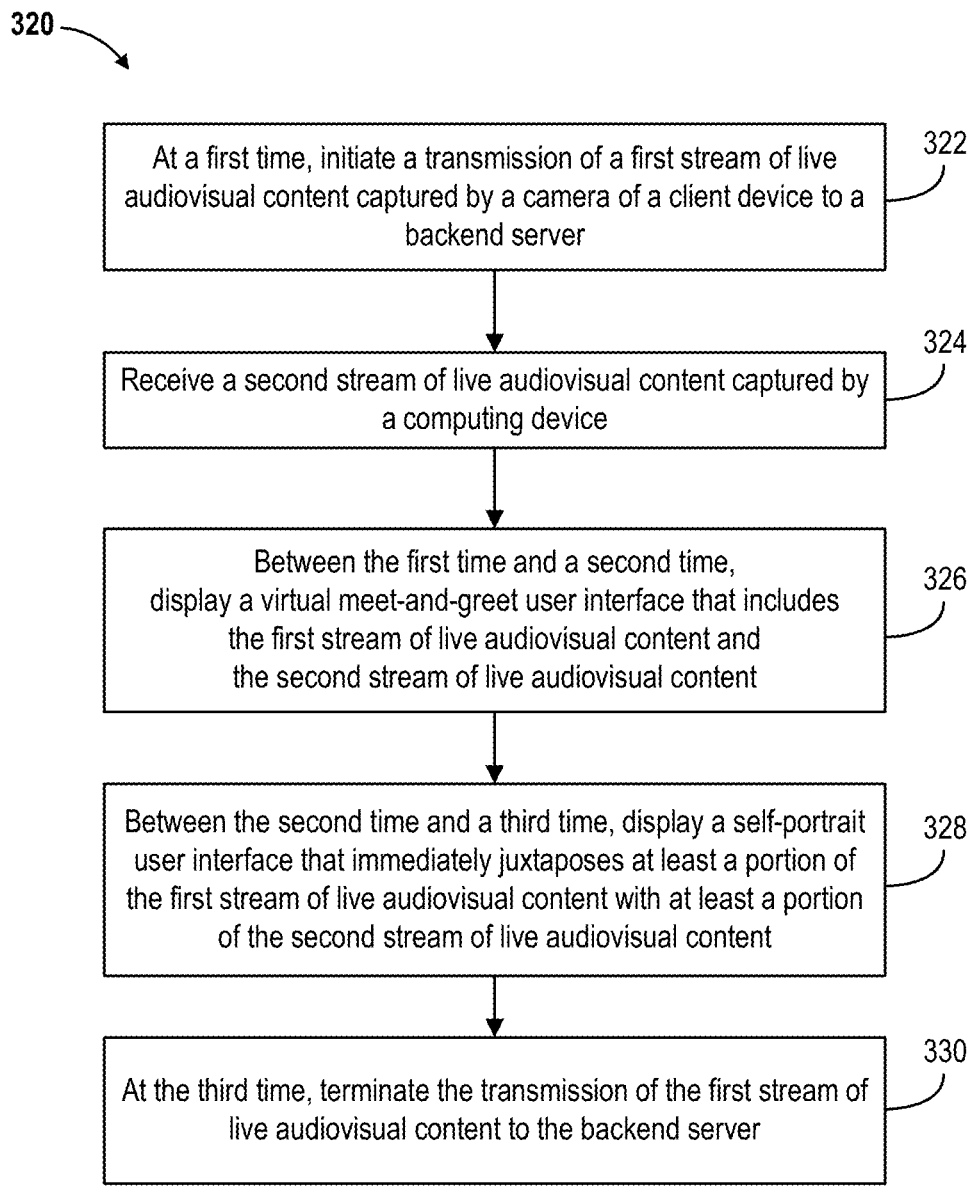
FIG. 3B is a flowchart of a method for carrying out scheduled video chat sessions, according to various aspects of the present disclosure.

FIG. 3B is a flowchart of a method 320 for facilitating a virtual meet-and-greet, according to various aspects of the present disclosure. Some or all of the aspects of method 300 may be performed by a computing device, such as one of the client devices 120. For the purposes of the following description, method 320 is described as being performed by a "client device."

At block 322, the client device initiates a transmission of a first stream of live audiovisual content captured by a camera of the client device to a backend server. The client device may be, for example, a smartphone, tablet, or laptop computer, among other possible computing devices or systems. For the purposes of describing the method 320, the "camera" may include a combination of imager(s) and microphone(s), such that the camera captures both video data and audio data. The audiovisual content may capture, for instance, a user's face and/or bust through a front-facing camera of the client device. In this example, the client device may be associated with a fan of a celebrity.

At block 324, the client device receives a second stream of live audiovisual content captured by the computing device. In this example, the second stream of live audiovisual content may represent live video and audio of a celebrity. The second stream of live audiovisual content may be transmitted to the client device from a backend server acting as an intermediate device between the computing device and the client device.

At block 326, the client device displays a virtual meet-and-greet user interface between the first time and a second time. The period of time between the first time and second time may represent a portion of a time slot within a timetable allotted to the fan's account associated with the client device. The virtual meet-and-greet user interface may display, for example, at least a portion of the first stream of live audiovisual content and at least a portion of the second stream of live audiovisual content simultaneously, to represent a live two-way chat. As one example, the first stream of live audiovisual content may be displayed in a relatively compact size at a corner of the screen, which overlays onto a substantially full screen representation of the second stream of live audiovisual content.

At block 328, the client device displays a self-portrait user interface between the second time and a third time. The period of time between the second time and the third time may represent another portion of the time slot within the timetable allotted to the fan's account associated with the client device. Collectively, the period of time spanning from the first time to the third time represents the time slot allotted to the fan's account associated with the client device.

The self-portrait user interface may immediately juxtapose at least a portion of the first stream of live audiovisual content with at least a portion of the second stream of live audiovisual content. The manner in which the two streams of audiovisual content are juxtaposed may depend on the particular "selfie template" used or selected by the user of the client device. Example selfie templates are shown and described in more detail below with respect to FIGS. 5A-5C.

As a specific example, the client device may, at the second time, begin to display a "leaning" selfie template (see an example "leaning" selfie template in FIG. 5B) which displays a portion of the second stream of audiovisual content (e.g., the celebrity) immediately next to a portion of the first stream of audiovisual content (e.g., the fan), with the two streams being split or divided along a curve that approximately represents the shape of the fan's head and shoulders being tilted slightly toward the celebrity—leading to an appearance of the fan placing his or her head on the shoulder of the celebrity. The client device may display this "leaning" selfie template for some duration of time (e.g., 10 seconds), to allow the fan and the celebrity to situate themselves for the self-portrait. At the expiration of this time, a still image or snapshot of the first and second live audiovisual contents are captured, providing the fan with memorabilia at the conclusion of their private virtual meet-and-greet session with the celebrity.

Generating the self-portrait user interface may involve applying one or more "masks" and/or virtually layering the audiovisual content on top of each other, together with other graphical assets. For example, with the "leaning" selfie template example, the celebrity's audiovisual content (on the left) may be placed "beneath" the fan's audiovisual content. The fan's audiovisual content may then be "masked," in that a portion of the video is made transparent or otherwise not shown. The resulting user interface may thereby simulate the live physical presence of the fan with the celebrity.

At block 330, the client device terminates the transmission of the first stream of live audiovisual content to the backend server at the third time, thereby ending the private one-on-one video chat session with the celebrity.

Although the method 320 is described as being performed by a client device, some or all aspects of the method 320 may be carried out by one or more other computing devices, such as a backend server. For example, a backend server may instruct the client device to begin capturing audiovisual data and transmitting that data to the server. Additionally, a backend server may cause the private one-on-one video chat session to end by discontinuing the transmission of the second stream of live audiovisual content to the client device and/or instructing the client device to stop capturing and transmitting the first stream of live audiovisual content. A backend server may also perform other aspects of the method 320.

Furthermore, in some implementations, a backend server may transmit information to the client device, such as the first time and the second time, together with instructions to stop displaying the second stream of live audiovisual content at the second time and/or to stop capturing and transmitting the first stream of live audiovisual content at the second time.

Figure 4:
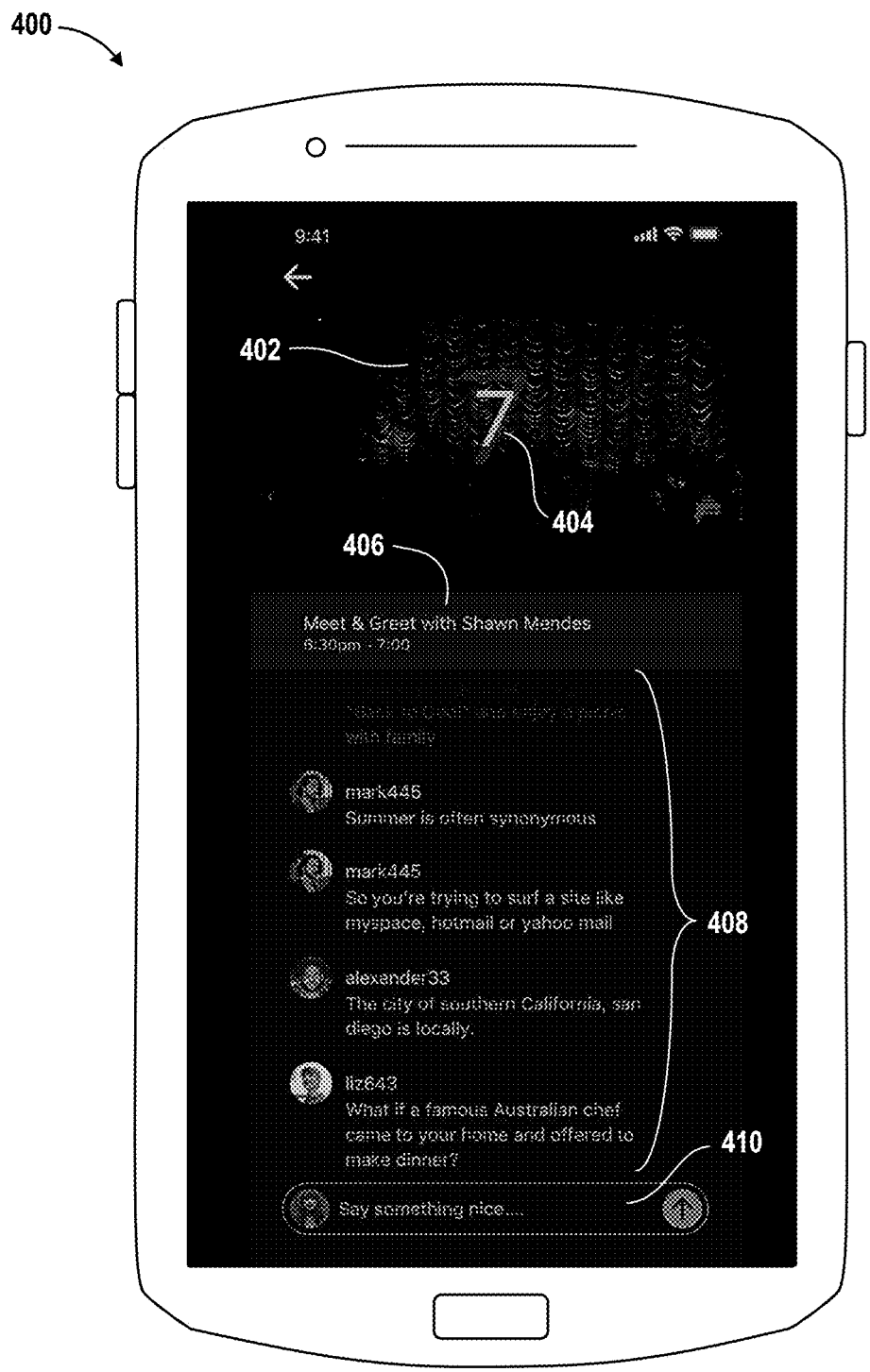
FIG. 4 is an example user interface of a virtual waiting room, according to various aspects of present disclosure.
Figure 5A:
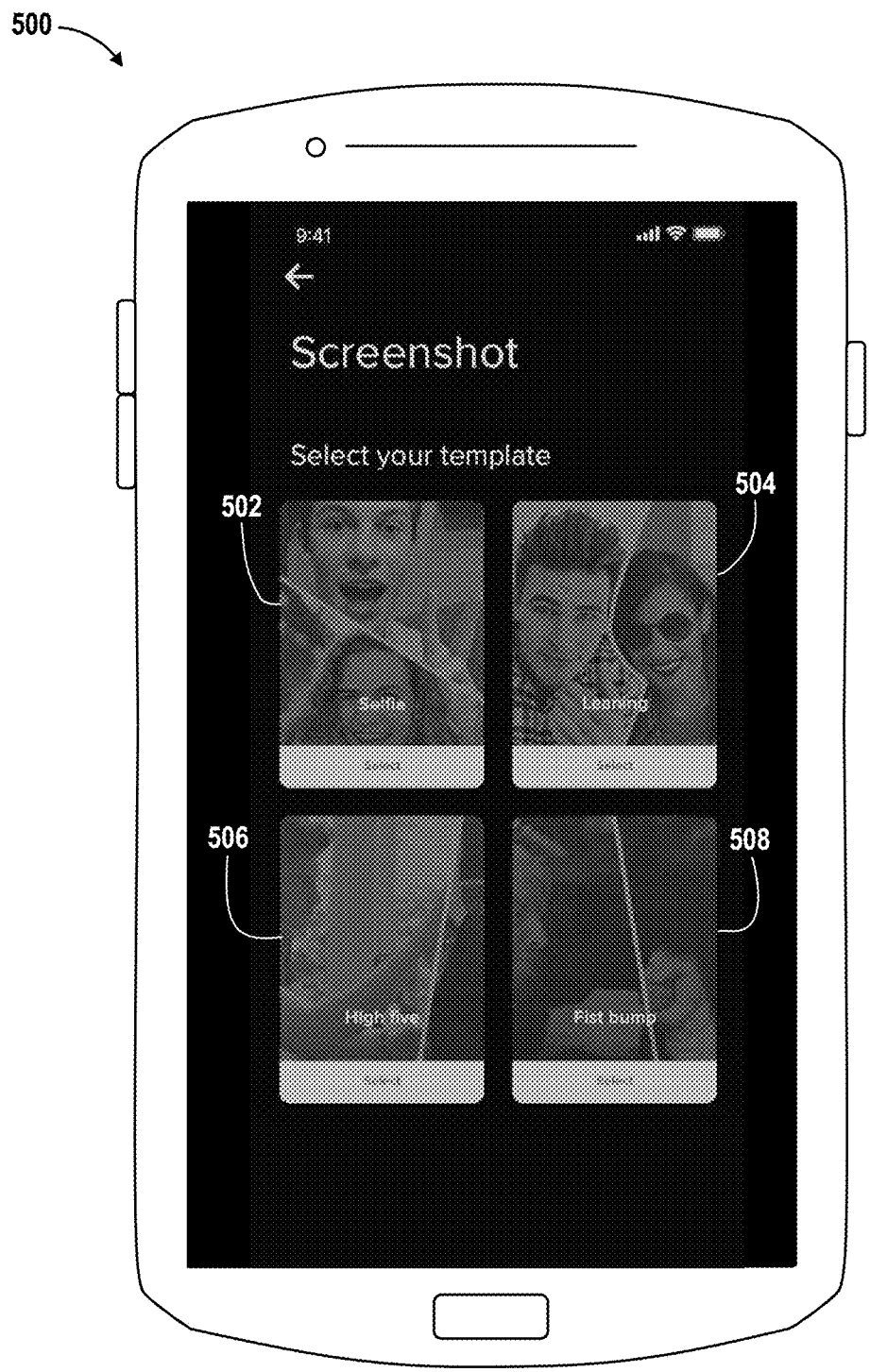
FIGS. 5A-5E depict example user interfaces of selfie templates, according to various aspects of the present disclosure.
Figure 5B:

FIGS. 4 and 5A-5B depict example user interfaces of the virtual meet-and-greet platform of the present disclosure. Although specific graphical elements, arrangements of those elements, typefaces, operating systems, and client device hardware are depicted, the user interfaces of the present application are not limited to any particular smartphone or tablet manufacturer, operating system, or particular user interface designs. The example user interfaces are provided for explanatory purposes.

FIG. 4 is an example user interface 400 of a virtual waiting room, according to various aspects of present disclosure. The virtual waiting room user interface includes a splash image 402, a countdown timer 404, an informational banner 406, a chat conversation window 408, and a text chat input box 410.

In this example, the splash image 402 depicts stage curtains, indicative of the wait before a performance or show. Overlaid on top of the splash image 402 is a countdown timer 404, which may display the minutes and/or seconds remaining before the fan is connected with the celebrity for a private one-on-one video chat session. An informational banner 406 is displayed below the splash image 402, which provides information such as the duration of the virtual meet-and-greet and the celebrity for which the virtual meet-and-greet is arranged. In this example, the information banner 406 shows that the virtual meet-and-greet with "Shawn Mendes" extends for thirty minutes from 6:30 PM to 7:00 PM.

The chat conversation window 408 and the text chat input box 410 collectively form a "chat box" for the virtual waiting room. One or more users, such as the users waiting for their time slot with Shawn Mendes according to this example, may enter text into the text chat input box, which may be displayed chronologically with text chat submissions from other users in the chat conversation window 408. Each user account may include an avatar or image of the user, along with a username associated with the account. When a user submits text entered into the text chat input box 410, their text submission may be displayed in the chat conversation window 408 in association with their avatar and username. The chat conversation may be publicly viewable by all users connected to the virtual waiting room.

FIG. 5A depicts an example user interface 500 for selecting a selfie template, according to various aspects of the present disclosure. In this example, four selfie templates are displayed for selection to the user: a "Selfie" template 502 (e.g., FIG. 5C), a "Leaning" template 504 (e.g., FIG. 5B), a "High five" template 506 (e.g., FIG. 5D), and a "Fist bump" template 508 (e.g., FIG. 5E). Each of these templates may provide an artistic juxtaposition of the two video frames. Some selfie templates may be designed to enable certain poses (e.g., the "Leaning" template allowing one person to virtually place their head on the other person's shoulder) or simulate some type of in-person interaction (e.g., the "High five" template providing the appearance of the two users high-fiving each other).

A selfie template may be selected by the user during or in advance of the private one-on-one video chat session with a celebrity. In some implementations, the user can select his or her preferred selfie template while waiting for their time slot in the virtual waiting room.

FIG. 5B illustrates an example user interface 510 for the "Leaning" template 504. On the left side, a video portion 512 of the celebrity is displayed, while a video portion 514 of the fan is displayed on the right side. Video portions 512 and 514 are immediately juxtaposed and split by a dividing curve 516. In this example, the dividing curve 516 is shaped similarly to the upper body of a person, with a rounded portion to accommodate the fan's head and a straight, slanted portion to accommodate the fan's shoulders and upper body. In this arrangement, the fan can virtually place her head on the celebrity's shoulder, giving the appearance of a "leaning" selfie pose.

Figure 5C:
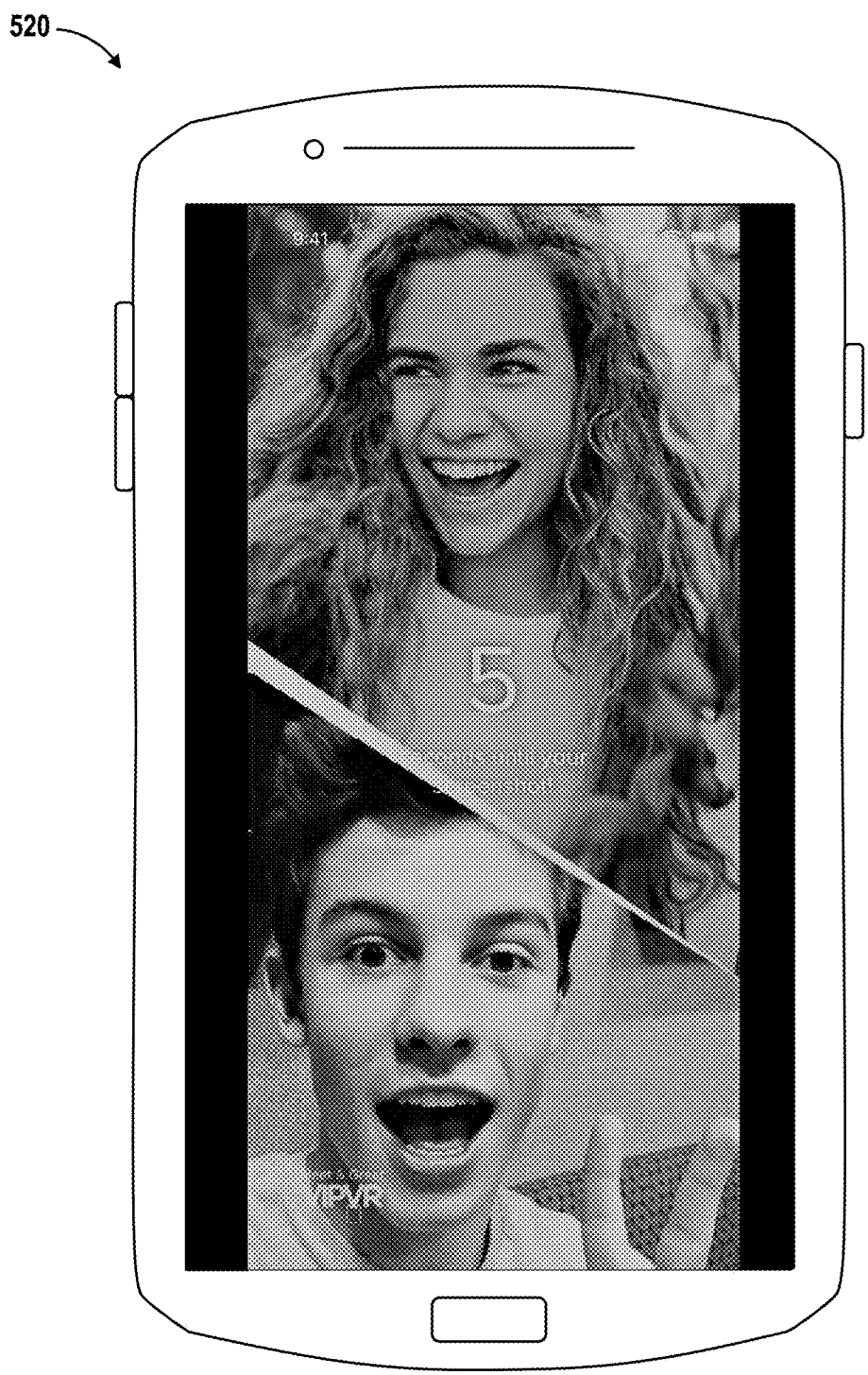

FIG. 5C illustrates an example user interface 520 for the "Selfie" template 502. As shown in FIG. 5C, the juxtaposition of the two video frames may allow for a portrait orientation, rather than a landscape orientation as shown in FIGS. 5B, 5E, and 5E. In addition, the user interface 520 includes a countdown timer, indicating a time at which the selfie snapshot is to be taken (e.g., to allow users to strike a pose prior to the selfie snapshot).

Figure 5D:
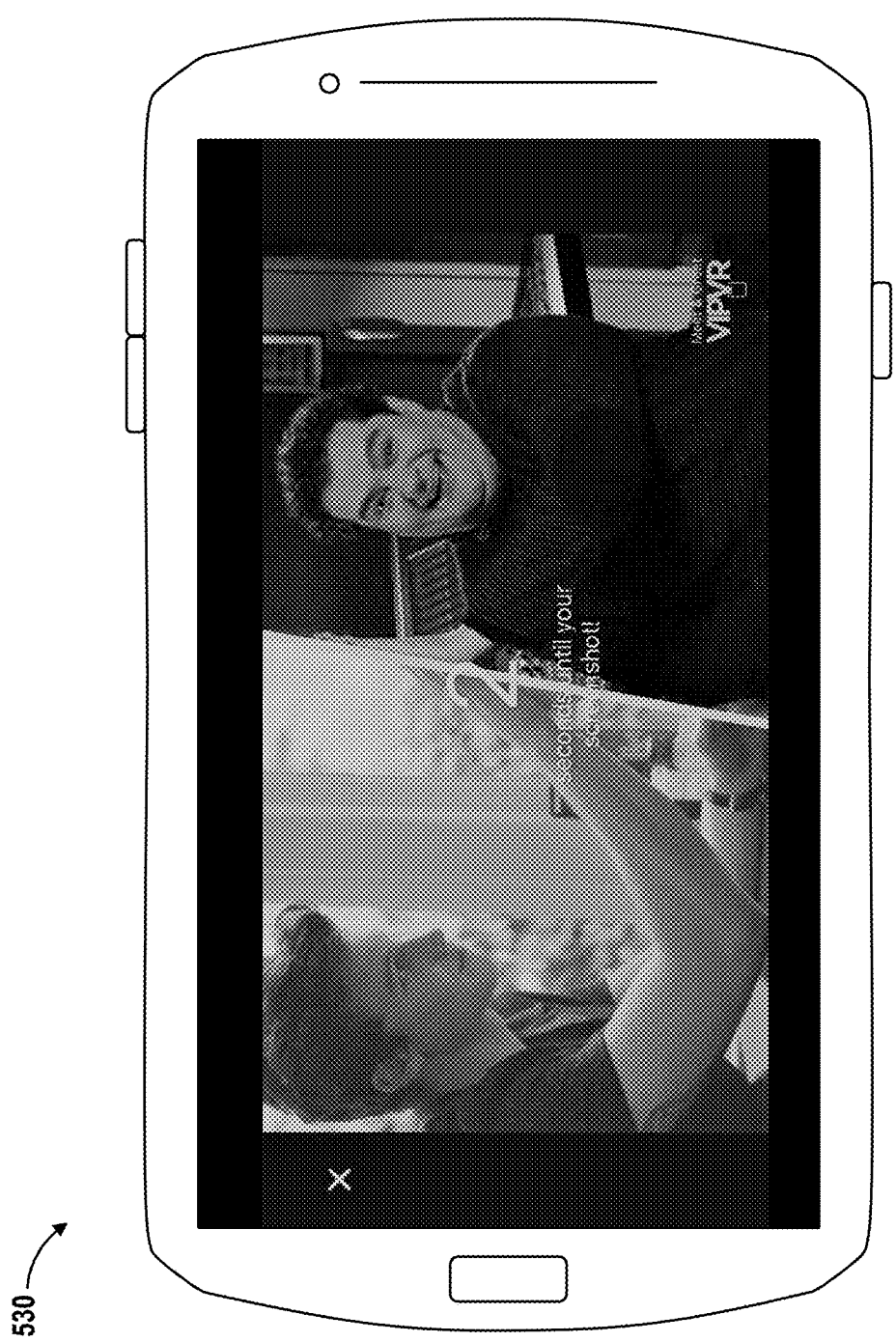
Figure 5E:

FIG. 5D illustrates an example user interface 530 for the "High five" template 506. As shown in FIG. 5D, the juxtaposition of the two video frames may allow for the user's to align their hands in their respective frames, to give the impression of the two users giving each other a "high five."

FIG. 5E illustrates an example user interface 540 for the "Fist bump" template 508. As shown in FIG. 5E, the juxtaposition of the two video frames may allow for the user's to align their fists in their respective frames, to give the impression of the two users giving each other a "fist bump."

In some embodiments, the selfie template may provide additional graphical elements or overlays in order to provide a form of augmented reality (AR). For instance, a virtual environment (e.g., a backstage area, on stage location, national park, etc.) may replace the background, such that the fan and celebrity appear to be at a different location or conducting some activity together. As another example, the fan and celebrity might be placed into the driver's seats of race cars, providing the appearance that fan and celebrity are participating in a race.

Other fun and artistic "templates" may be provided to augment the appearance of the fan and/or celebrity. For example, a "kaleidoscope" effect may take pizza slice-shaped portions of the fan and the celebrity, and arrange them in a circular or elliptical wheel, possibly augmenting the color of the slices to simulate a kaleidoscope. As another example, a miniature version of the fan may be placed onto the outstretched palm of the celebrity. As yet another example, a "split screen" template may horizontally flip the lower half of both the fan's and celebrity's video, such that their noses and mouths appear to be swapped.

In some cases, the selfie template may simply provide instructions to the fan and celebrity to make a particular pose, without augmenting changing the juxtaposition of the video streams. For example, the selfie template may instruct the celebrity and fan to form the fan's initials, using their arms and upper body (e.g., similar to the well-known "YMCA" dance).

Some selfie templates may capture two or more images, and stitch them together to form the output "selfie" for the fan. For example, a "photobooth" effect may capture a series of images—some of both the fan and celebrity, some with just the fan, and some with just the celebrity—and then arrange those photos into a mosaic or grid.

As yet another example, a selfie template may use AR technology to provide virtual props to the fan and celebrity. For example, a "Winners!" template may place a trophy in between the fan and celebrity, allowing them to virtually hoist up the trophy together (each with one hand on the trophy, for instance). As another example, the fan and celebrity may strike a pose or make a facial expression, onto which virtual chat bubbles are overlaid extending from the fan's mouth and the celebrity's mouth. These virtual chat bubbles may contain an expression, catch phrase, or emoji, for example.

Figure 6:
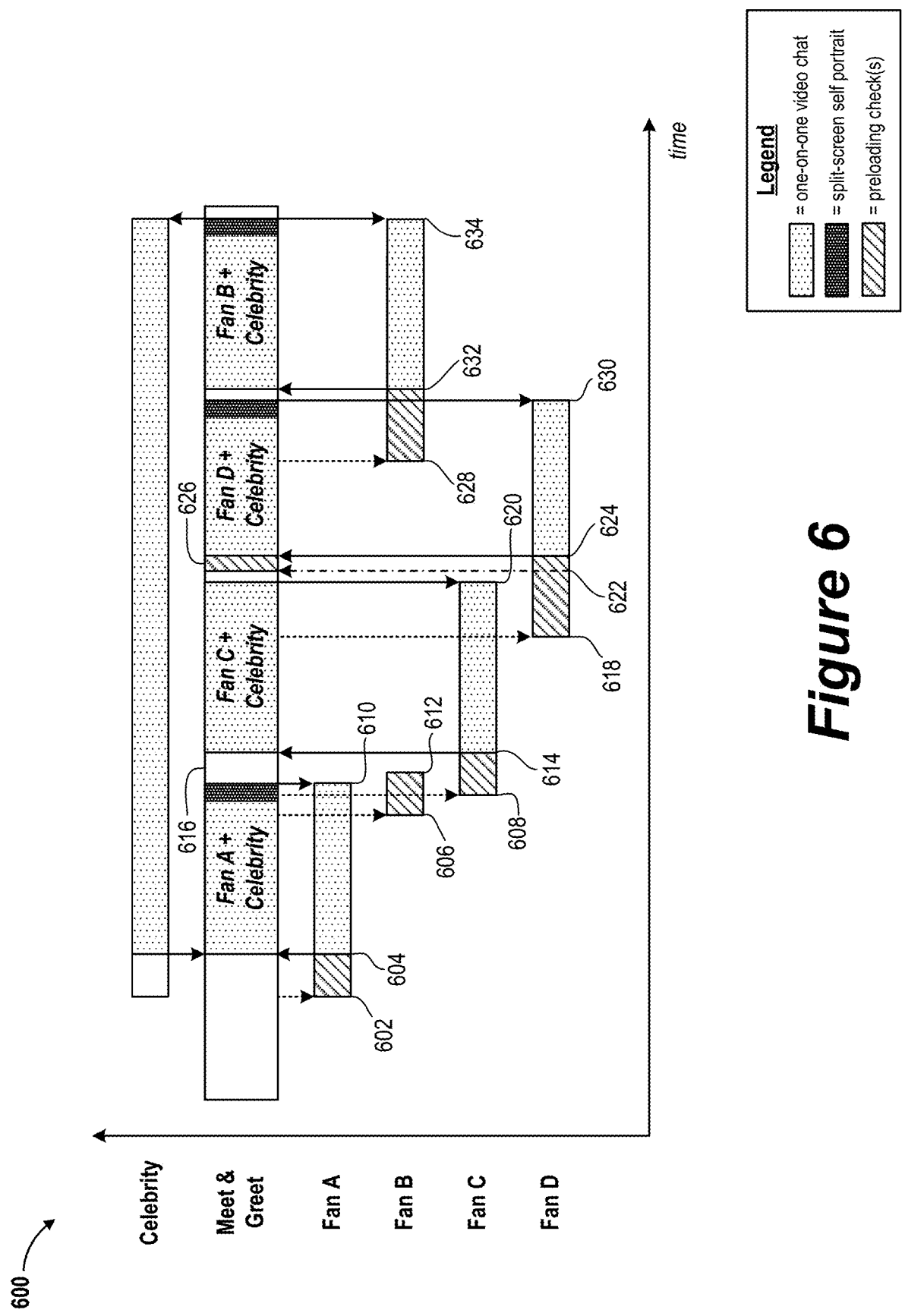
FIG. 6 is a conceptual diagram of an example virtual meet-and-greet procedure with preloading, according to various aspects of the present disclosure.

FIG. 6 illustrates a conceptual diagram 600 of an example virtual meet-and-greet procedure with preloading, according to various aspects of the present disclosure. The layout of diagram 600 may be similar to that of diagram 200 shown in FIG. 2. However, in FIG. 6, the diagonal line shading is used to denote a stage in which preloading checks are performed by the associated Fan or Celebrity. In addition, FIG. 6 omits the Waiting Room shown and described with respect to FIG. 2; however, it should be understood that a waiting room, or any combination of features described herein, may be integrated into a platform in conjunction with the meet-and-greet video chat techniques disclosed herein.

In the example shown in FIG. 6, the initial order of the virtual line starts with Fan A, and continues through Fans B, C, and D in that order. Fans A, C, and D all pass their respective initial preloading checks, and are thereafter connected to the Meet & Greet according to their place in the queue to have a private one-on-one video chat session with the Celebrity. However, Fan B fails to pass his or her initial preloading check. As a result, Fan B is skipped, Fans C and D are moved up in the virtual line, and Fan B is placed at the end of the Meet & Greet session.

At time 602, the Meet & Greet system initiates the preloading checks for the client device of Fan A. At or before time 604, the Meet & Greet system determines that the client device of Fan A passed the preloading checks. At time 604, the Meet & Greet system initiates a private virtual meet-and-greet video chat between the Celebrity and Fan A.

During the meet-and-greet session between Fan A and the Celebrity, at time 606, the Meet & Greet system initiates the preloading checks for the client device of Fan B. By time 608, the Meet & Greet system determines that the client device of Fan B is not yet preloaded, and subsequently begins the preloading checks for the client device of Fan C. By time 610, the meet-and-greet session between Fan A and the Celebrity has ended, but unfortunately neither Fans B nor C have passed their preloading checks yet. As a result, a brief period of idle time 616 may result, where the Celebrity waits for the next fan to pass the preloading stage and begin the next meet-and-greet session.

At time 612, the Meet & Greet system determines that the client device of Fan B has failed to pass the preloading checks. The possible reasons for failing the preloading stage are described above and below in greater detail.

At time 614, the client device of Fan C has successfully completed and passed the preloading checks, and is connected to the Celebrity to initiate the next meet-and-greet session. During the meet-and-greet session between Fan C and the Celebrity, at time 618, the Meet & Greet system initiates the preloading checks for the client device of Fan D (the next Fan in the virtual line). At time 620, the meet-and-greet session between Fan C and the Celebrity ends.

By time 622, Fan D has passed the preloading checks. However, in this case, the Celebrity chooses to view the preloading video captured by the client device of Fan D to determine whether to accept or decline a meet-and-greet session with Fan D (e.g., possibly due to a prior infraction by Fan D of the platform's terms of service, if Fan D has a rating level below a threshold level, if Fan D's account is new or unverified, etc.). After a preloading video viewing 626 by the Celebrity, the Celebrity chooses to proceed with the virtual meet-and-greet with Fan D, and at time 624, the video chat between Fan D and the Celebrity begins.

During the meet-and-greet session between Fan D and the Celebrity, at time 628, the Meet & Greet system initiates a second round of preloading checks for the client device of Fan B. The second round of preloading checks for the client device of Fan B may be performed earlier than the first round of preloading checks, such that the determination of whether or not Fan B passes the preloading check may be completed before or soon after the end of the virtual meet-and-greet between the Celebrity and Fan D at time 630.

At time 632, the Meet & Greet system determines that Fan B has successfully passed the preloading stage, and proceeds to connect Fan B to the Celebrity for a private one-on-one video chat session. At time 634, the video chat session between Fan B and the Celebrity ends, and both Fan B and the Celebrity exit the Meet & Greet session.

As demonstrated by the example shown in FIG. 6, a virtual meet-and-greet session may, in some cases, involve dynamic scheduling and on-the-fly changes to reduce the amount of idle time that would otherwise occur if a particular fan fails to connect during a predetermined, static time slot. In addition, the duration of each virtual meet-and-greet may vary among participants. For example, the Celebrity may extend or cut short a given meet-and-greet with a particular fan. These aspects of the platform, combined with the preloading techniques disclosed herein, may help facilitate a less rigid and more fluid virtual meet-and-greet session that is not necessarily bound by a strict timeline, and permits flexibility and some level of control by the Celebrity to provide a more natural experience akin to a real-life meet-and-greet.

Figure 7:
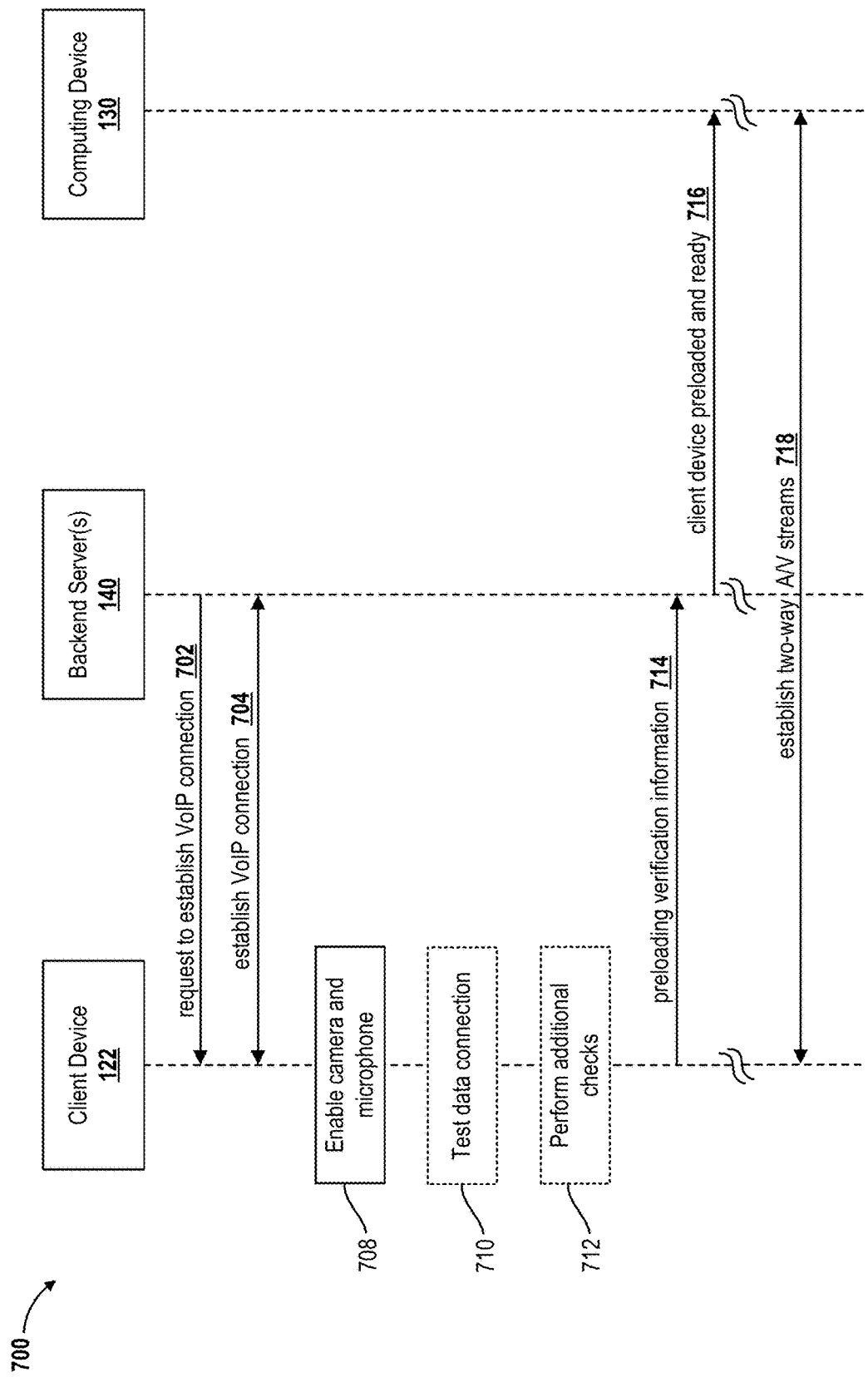
FIG. 7 is a data flow diagram illustrating example preloading operations, according to various aspects of the present disclosure.

FIG. 7 is a data flow diagram 700 illustrating example preloading operations, according to various aspects of the present disclosure. The data flow diagram 700 illustrates data transmissions between devices using arrows extending across vertical axes associated with each of the client device 122 (e.g., a fan's device), the backend server(s) 140 (e.g., the platform), and the computing device 130 (e.g., a celebrity's or public figure's device). In addition, operations performed by a particular device is drawn as a box overlaid onto the particular device's axis. Boxes that are drawn in dashed lines indicate optional steps that may or may not be performed, depending on the particular implementation. Moreover, the preloading operations shown in diagram 700 illustrate one example set of operations—other combinations of operations in various suitable orders may also comprise the preloading operations. It should be understood that the example depicted in FIG. 7 is provided for explanatory purposes only, and does not limit the disclosure in any way.

Initially, the backend server(s) 140 transmit a request to establish a VoIP connection 702 to the client device 122. After receiving the request 702, the client device 122 and establishes a VoIP connection 704 with the backend server(s) 140. In some cases, failure to establish a VoIP connection may be indicative of a user of the client device 122 being away from the device. In this example, the VoIP connection 704 is successfully established. In some cases, the meet-and-greet application may be opened, launched, or otherwise brought into focus prior to establishing the VoIP connection 702. The meet-and-greet application may include software to facilitate virtual meet-and-greet video chats, provide user interfaces for accessing the platform, and include software routines for preloading checks or tests.

At operation 708, the client device 122 enables its camera and the microphone, and the meet-and-greet application attempts to access the data captured by the camera and microphone. At operation 710, the client device 122 may perform data connection tests, as described above in greater detail. The data connection tests may involve sending data to and receiving data from the backend server(s) 140 (e.g., over the VoIP connection, or separately) to assess the speed and quality of the client device's 122 data connection. The client device 122 may perform various other preloading checks at operation 712, such as authenticating or verifying the user, checking that the user of the client device 122 has satisfied one or more conditions designated by the celebrity or public figure (e.g., an answer to a question for a conversation starter), or any other precondition that, if not met, would result in the client device 122 not meeting the requirements to proceed with a virtual meet-and-greet.

At step 714, the client device 122 transmits preloading verification information 714 to the backend server(s) 140. The preloading verification information 714 may, in some embodiments, be a summary indication of the state of the client device 122 (e.g., preloaded, not preloaded, in the waiting room, etc.). In other embodiments, the preloading verification information 714 may include information associated with each preloading operation (e.g., indications of whether the camera is accessible, whether the microphone is accessible, the upload and download speeds, etc.). The backend server(s) 140 may process this information to determine whether or not the client device 122 can be deemed "preloaded" and ready for a virtual meet-and-greet.

At step 716, the backend server(s) 140 transmits an indication 716 that the client device is preloaded and ready to the computing device 130. At step 718, the computing device 130 establishes two-way audio/video streaming 718 with the client device 122 (which may occur when a previous meet-and-greet session ends, when the celebrity indicates to the backend server(s) 140 that he or she is ready for the next participant, etc.).

Figure 8:
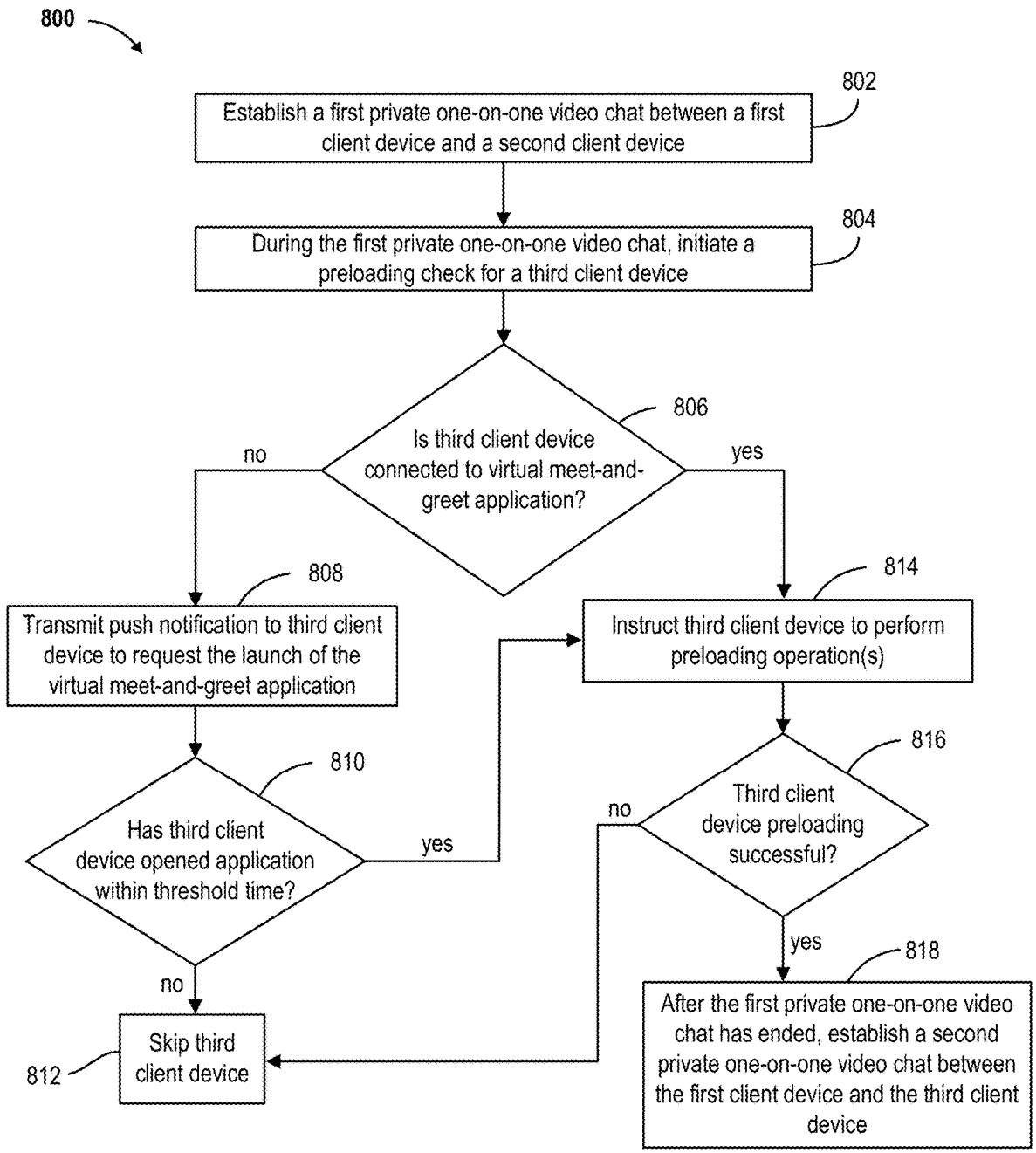
FIG. 8 is a flowchart of a method for facilitating a virtual meet-and-greet with preloading checks, according to various aspects of the present disclosure.

FIG. 8 is a flowchart of a method 800 for facilitating a virtual meet-and-greet with preloading checks, according to various aspects of the present disclosure. Some or all of the aspects of method 800 may be performed by one or more backend servers, such as the backend server(s) 140, and/or other computing devices. For the purposes of the following description, steps of method 900 may be described as being performed by a backend server, a device, or simply described as being performed. It should be understood that the steps of the method may be performed by a backend server, by one or more client devices, or some combination thereof.

At block 802, the method involves establishing a first private one-on-one video chat between a first client device and a second client device. The first client device may be associated a celebrity or public figure, while the second client device may be associated with a fan or participant. Establishing the video chat may involve the backend server causing the first client device to transmit an audiovisual stream captured therewith to the second client device, and causing the second client device to transmit an audiovisual stream captured therewith to the first client device. In some implementations, the backend server may simply instruct the first and second client devices to begin exchanging audiovisual streams. In other implementations, the backend server may receive audiovisual streams from each of the first and second client devices, and then forward on those streams to the respective second and first client devices.

At block 804, the method involves initiating a preloading check or procedure for a third client device during the first private one-on-one video chat. The third client device may be associated with another fan or participant. The preloading check or procedure may include any combination of preloading operations, which are described in greater detail above. Initiating a preloading check may involve transmitting a notification to the third client device, requesting that the user of the third client device launch the meet-and-greet application. Alternatively and/or additionally, initiating a preloading check may involve transmitting instructions to the third client device to begin performing one or more preloading operations.

At block 806, the method involves determining whether the third client device is connected to the virtual meet-and-greet application. The virtual meet-and-greet application may include software routines to connect the third client device to the backend server, which may continuously, periodically, or occasionally transmit messages to the backend server indicating that the third client device is online and accessing the meet-and-greet platform via the application. In other implementations, block 806 may involve the backend server transmitting a request to establish a VoIP call with the third client device through the virtual meet-and-greet application, which, in some cases, may only be received if the virtual meet-and-greet application is running on the third client device.

If the third client device is not connected to the virtual meet-and-greet application, the method 800 proceeds to block 808. At block 808, the method involves transmitting a push notification to the third client device to request that the third client device launch the virtual meet-and-greet application. The request may include human-readable text and/or graphics prompting the user to open the virtual meet-and-greet application. Alternatively and/or additionally, the push notification may include a link (e.g., a URL, hyperlink, callback URL, etc.) that, when interacted with, causes the third client device to launch the virtual meet-and-greet application.

After a threshold period of time (e.g., a timeout) has elapsed, the method 800 proceeds to block 810. At block 810, the method involves determining whether the third client device has opened the virtual meet-and-greet application. Block 810 may be similar to or the same as block 806. If the third client device still has not opened the application within the threshold period of time, the system may determine that the third client device is unreachable or unavailable, and proceed to block 812.

If the third client device was initially connected to the virtual meet-and-greet application, or opened the application within the threshold period of time after the transmission of the push notification at block 808, the method proceeds to block 814. At block 814, the method involves instructing the third client device to begin performing one or more preloading operations. Example preloading operations are described above and below in greater detail.

At block 816, the method involves determining whether the third client device successfully completed the one or more preloading operations. The preloading operations may include one or more hardware and/or software checks or tests executed by the third client device, to confirm that the device's hardware and software are operational and ready to support a live video chat. In some cases, the preloading operations may include a predetermined set of tests that either pass or fail on the third client device. In such cases, the preloading operations may be deemed successful if none of the preloading tests failed. In other implementations, the preloading operations may include one or more diagnostics or tests that provide a quantitative or qualitative description of the status of the device. In such implementations, the third client device or the server may analyze the quantitative or qualitative results of the preloading tests to determine whether they meet or exceed minimum thresholds, or otherwise collectively represent a status of the device that is satisfactory for participation in a live video chat.

If the preloading operations failed or otherwise produced unsatisfactory results, the method 800 may proceed to block 812 and "skip" the third client device (or change the third client device's place in the virtual line). Alternatively, if the preloading operations succeeded or otherwise produced satisfactory results, then the method 800 may proceed to block 818.

At block 818, the method involves establishing a second private one-on-one video chat between the first client device and the third client device based at least in part on the state of the third client device indicating that the third client device is ready to establish a private one-on-one video chat. Block 818 may be similar to block 802, other than the video chat being between the first and third client devices.

Figure 9A:
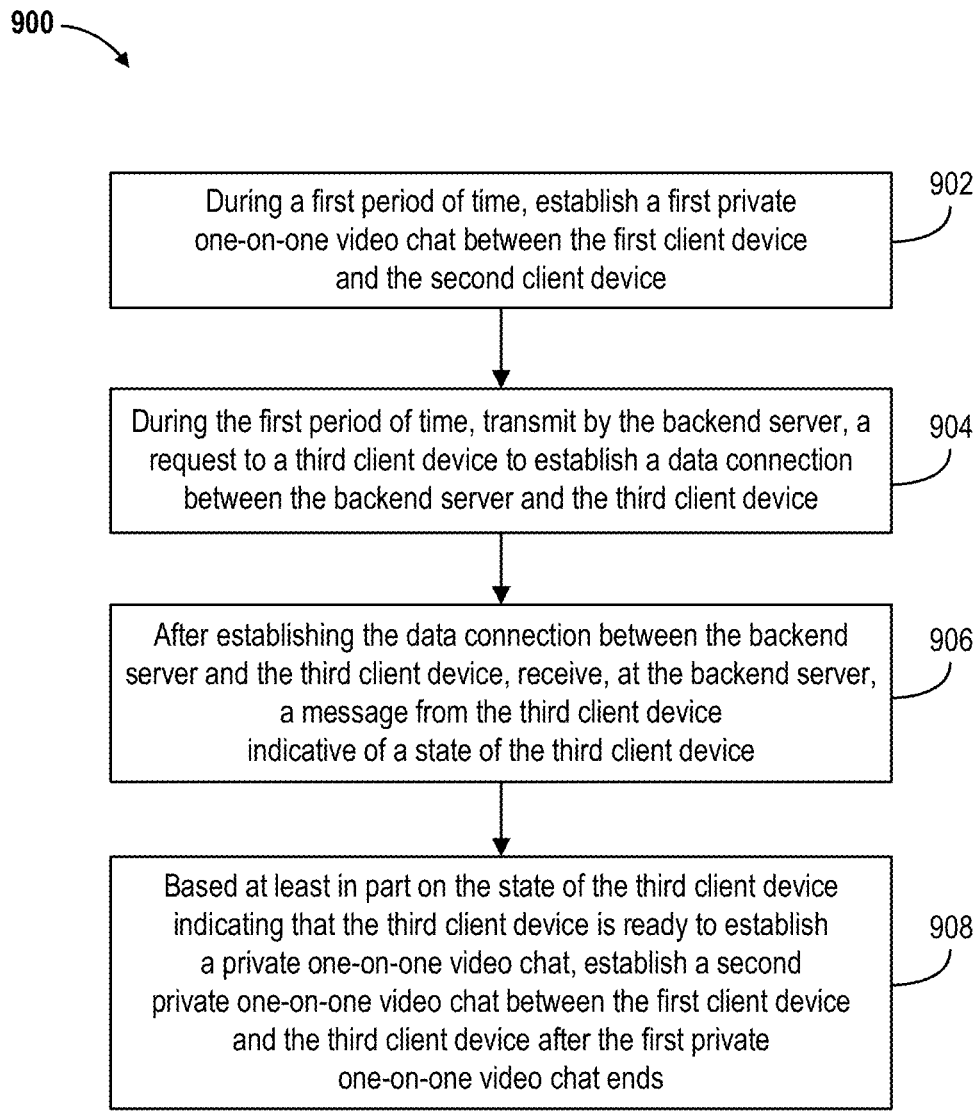
FIG. 9A is a flowchart of a method for carrying out a virtual meet-and-greet, according to various aspects of the present disclosure.

FIG. 9A is a flowchart of a method 900 for carrying out a virtual meet-and-greet, according to various aspects of the present disclosure. Some or all of the aspects of method 900 may be performed by one or more backend servers, such as the backend server(s) 140, and/or other computing devices. For the purposes of the following description, method 900 is described as being performed by a "backend server."

At block 902, the backend server establishes a first private one-on-one video chat between a first client device and a second client device. The first client device may be associated a celebrity or public figure, while the second client device may be associated with a fan or participant. Establishing the video chat may involve the backend server causing the first client device to transmit an audiovisual stream captured therewith to the second client device, and causing the second client device to transmit an audiovisual stream captured therewith to the first client device. In some implementations, the backend server may simply instruct the first and second client devices to begin exchanging audiovisual streams. In other implementations, the backend server may receive audiovisual streams from each of the first and second client devices, and then forward on those streams to the respective second and first client devices. Other arrangements are also possible.

At block 904, the backend server transmits a request to a third client device to establish a data connection between the backend server and the third client device. The third client device may be associated with another fan or participant. In various embodiments, the data connection may be any type of data connection indicative of the third client device's ability to interact with the backend server or platform. For example, the data connection may be a VoIP call facilitated through a virtual meet-and-greet application or other application. In some cases, the data connection may include a "handshake" indicating that the third client device has a virtual meet-and-greet application opened and has a data connection sufficient to access the platform.

In some cases, the third client device may not have a virtual meet-and-greet application open. In such cases, establishing the data connection may be preceded by the transmission of a notification to the third client device, requesting that the user of the third client device open the virtual meet-and-greet application.

Once the data connection has been established with the third client device, the server may instruct the third client device to begin performing one or more preloading operations. In performing the preloading operations, the third client device may record information indicative of the outcome of the preloading operations, which may be subsequently transmitted to the backend server for processing.

At block 906, the backend server receives a message from the third client device indicative of a state of the third client device. For example, the message may include information indicative of the outcome of the preloading operations, which is processed by the server to determine whether the preloading operations were successful so as to deem the third client device as "preloaded" or "ready." In some instances, the third client device may be connected to the virtual meet-and-greet application and in a virtual waiting room, and the state of the third client device may reflect that the device is online and connected to the application, but not necessarily "preloaded." If the third client device fails to pass the preload checks, it may be designated as having a state of "not preloaded" or "not ready." If the third client device is unreachable, the backend server may infer that the state of the third client device is "offline" or "unavailable."

At block 908, the backend server establishes a second private one-on-one video chat between the first client device and the third client device based at least in part on the state of the third client device indicating that the third client device is ready to establish a private one-on-one video chat. Establishing the video chat may involve the backend server causing the first client device to transmit an audiovisual stream captured therewith to the third client device, and causing the third client device to transmit an audiovisual stream captured therewith to the first client device. In some implementations, the backend server may simply instruct the first and third client devices to begin exchanging audiovisual streams. In other implementations, the backend server may receive audiovisual streams from each of the first and third client devices, and then forward on those streams to the respective third and first client devices. Other arrangements are also possible.

Figure 9B:
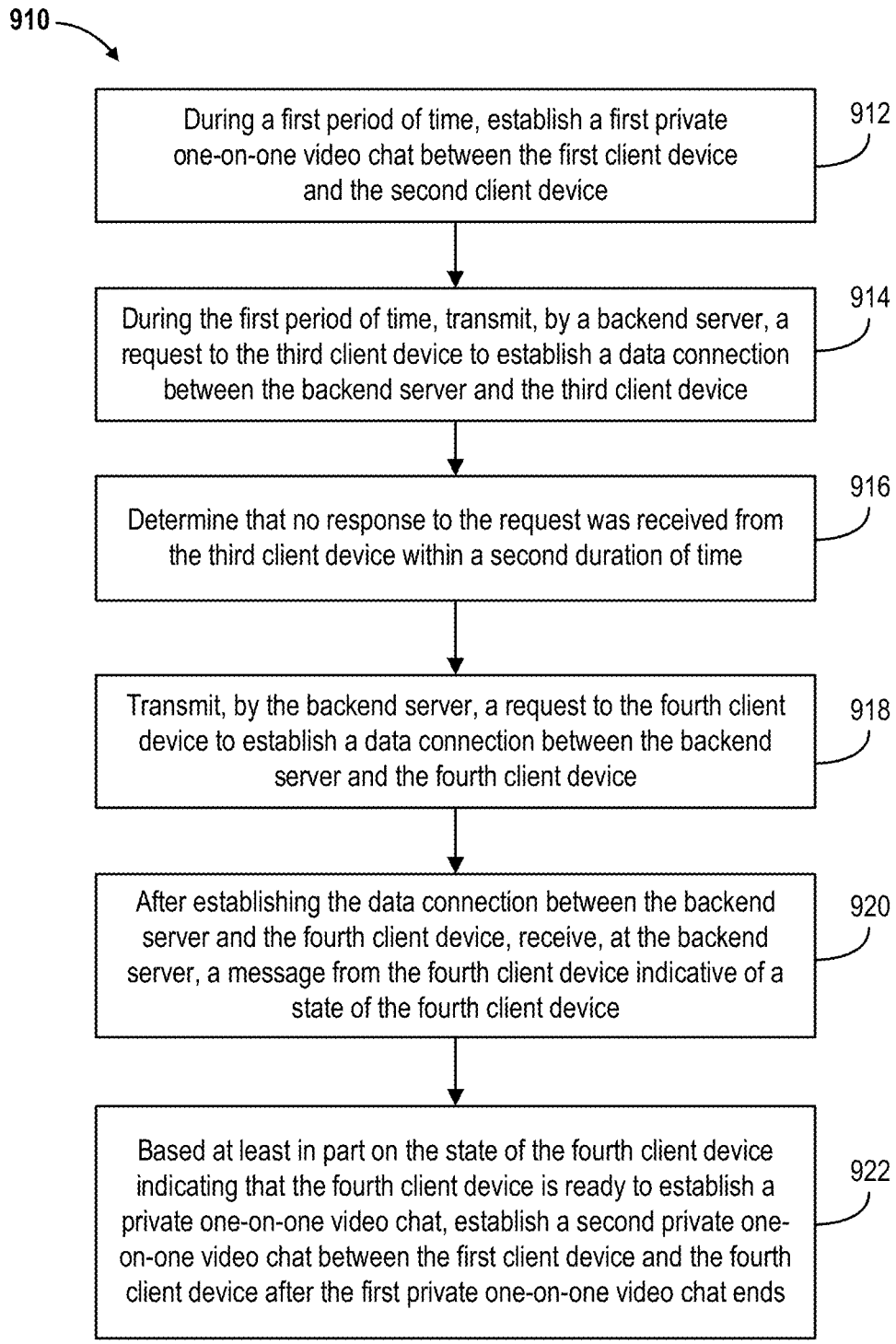
FIG. 9B is a flowchart of a method for carrying out a virtual meet-and-greet, according to various aspects of the present disclosure.

FIG. 9B is a flowchart of a method 910 for carrying out a virtual meet-and-greet, according to various aspects of the present disclosure. Some or all of the aspects of method 900 may be performed by one or more backend servers, such as the backend server(s) 140, and/or other computing devices. For the purposes of the following description, method 910 is described as being performed by a "backend server."

At block 912, the backend server may establish a first private one-on-one video chat between the first client device and the second client device during a first period of time. Block 912 may be similar to or the same as block 902 described above.

At block 914, the backend server may transmit a request to the third client device to establish a data connection between the backend server and the third client device during the first period of time. Block 914 may be similar to or the same as block 904 described above.

At block 916, the backend server may determine that no response to the request was received from the third client device within a second duration of time. For example, if the time elapsed between the transmission of the request at block 914 and the present time exceeds the second duration of time, the backend server may determine that the third client device is unreachable or unavailable. The second duration of time may be a predetermined timeout, determined relative to the anticipated end time of the current meet-and-greet session with a different participant, or determined relative to a planned start time of the participant's upcoming meet-and-greet session, among other possible methods. Regardless of the technique used, after the passage of the second duration of time, the backend server may determine that the third client device will not be ready for the upcoming planned meet-and-greet, skip the third client device, and proceed with the preloading of the next client device in line.

At block 918, the backend server may transmit a request to the fourth client device to establish a data connection between the backend server and the fourth client device. The fourth client device may be associated with a participant originally planned to have a meet-and-greet session following the third client device, but whose position in the virtual line was moved up due to the third client device's unavailability. Establishing the data connection at block 918 may be similar to the establishment of the data connection as described above and with respect to block 904.

At block 920, the backend server may receive a message from the fourth client device indicative of a state of the fourth client device. Block 920 may be similar to or the same as block 906, as described above with respect to FIG. 9A.

At block 922, the backend server may establish a second private one-on-one video chat between the first client device and the fourth client device after the first private one-on-one video chat ends. Block 922 may be similar to or the same as block 908, as described above with respect to FIG. 9A.

Some or all of the features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

While various aspects and implementations have been disclosed herein, other aspects and implementations will be apparent to those skilled in the art. The present embodiments are susceptible to modifications and alternate constructions from those discussed above. Consequently, the present invention is not limited to the particular embodiments disclosed. Rather, numerous modifications and alternate constructions fall within the spirit and scope of the present disclosure. For example, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. The steps in the processes described herein need not be performed in the same order as they have been presented, and may be performed in any order(s) unless logic dictates a particular order. Further, steps that have been presented as being performed separately may in alternative embodiments be performed concurrently. Likewise, steps that have been presented as being performed concurrently may in alternative embodiments be performed separately. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A computer-implemented method for facilitating a virtual meet-and-greet between a first client device, a second client device, and at least a third client device, the method comprising:

during a first period of time, establishing a first private one-on-one video chat between the first client device and the second client device by (i) causing transmission of a first audiovisual stream from the first client device to the second client device and (ii) simultaneously causing transmission of a second audiovisual stream from the second client device to the first client device;

during the first period of time, transmitting, by a backend server, a request to the third client device to establish a data connection between the backend server and the third client device;

after establishing the data connection between the backend server and the third client device, receiving, at the backend server, a message from the third client device indicative of a state of the third client device;

based at least in part on the state of the third client device indicating that the third client device is connected to a virtual waiting room associated with the virtual meet-and-greet, transmitting, by the backend server, instructions to the third client device to perform one or more preloading operations, wherein successful performance of the one or more preloading operations causes the third client device to be in a state of readiness to establish a private one-on-one video chat; and based at least in part on the state of the third client device indicating that the third client device is ready to establish the private one-on-one video chat, establishing a second private one-on-one video chat between the first client device and the third client device by (i) causing transmission of the first audiovisual stream to the third client device and (ii) simultaneously causing transmission of a third audiovisual stream from the third client device to the first client device.

2. The computer-implemented method of claim 1, wherein transmitting, by the backend server, the request to the third client device to establish the data connection between the backend server and the third client device comprises:

determining that a virtual meet-and-greet software application is running on the third client device;

based on determining that the virtual-meet-and-greet software application is running on the third client device, transmitting an invitation to the third client device to initiate a Voice over Internet Protocol (VoIP) call between the third client device and the backend server; and upon receiving an acknowledgment from the third client device, establishing the VoIP call as the data connection between the backend server and the third client device.

3. The computer-implemented method of claim 2, wherein transmitting, by the backend server, the request to the third client device to establish the data connection between the backend server and the third client device further comprises:

during the VoIP call between the third client device and the backend server, determining that the backend server is receiving audiovisual data from the third client device, wherein the message from the third client device, which is indicative of the state of the third client device, comprises data transmitted during the VoIP call indicating that a camera of the third client device and a microphone of the third client device are operational.

4. The computer-implemented method of claim 3, further comprising:

determining that the audiovisual data from the third client device does not include images representative of at least one predetermined category of objects, wherein the at least one predetermined category of objects are prohibited in the virtual meet-and-greet, wherein the message from the third client device indicating that the third client device is ready to establish the private one-on-one video chat is determined based at least in part on the audiovisual data from the third client device not including images representative of the at least one predetermined category of prohibited objects.

5. The computer-implemented method of claim 2, wherein transmitting, by the backend server, the request to the third client device to establish the data connection between the backend server and the third client device further comprises:

during the VoIP call between the third client device and the backend server, determining that the backend server is receiving audio data from the third client device; and determining, by the third client device, that a camera of the third client device is operational and accessible by the virtual meet-and-greet software application, wherein the message from the third client device indicative of the state of the third client device comprises data transmitted during the VoIP call indicating the microphone of the third client device is operational and data indicative that the camera of the third client device is operational and accessible by the virtual meet-and-greet software application.

6. The computer-implemented method of claim 1, wherein transmitting, by the backend server, the request to the third client device to establish the data connection between the backend server and the third client device comprises:

determining that a virtual meet-and-greet software application is not running on the third client device; and based on determining that the virtual meet-and-greet software application is not running on the third client device, transmitting a push notification to the third client device, wherein interacting with the push notification causes the third client device to launch the virtual meet-and-greet software application.

7. A computer-implemented method for facilitating a virtual meet-and-greet between a first client device, a second client device, a third client device, and a fourth client device, the method comprising:

during a first period of time, establishing a first private one-on-one video chat between the first client device and the second client device by (i) causing transmission of a first audiovisual stream from the first client device to the second client device and (ii) simultaneously causing transmission of a second audiovisual stream from the second client device to the first client device;

during the first period of time, transmitting, by a backend server, a request to the third client device to establish a data connection between the backend server and the third client device;

determining that no response to the request was received from the third client device within a second duration of time;

transmitting, by the backend server, a request to the fourth client device to establish a data connection between the backend server and the fourth client device;

after establishing the data connection between the backend server and the fourth client device, receiving, at the backend server, a message from the fourth client device indicative of a state of the fourth client device;

based at least in part on the state of the fourth client device indicating that the fourth client device is connected to a virtual waiting room associated with the virtual meet-and-greet, transmitting, by the backend server, instructions to the fourth client device to perform one or more preloading operations, wherein successful performance of the one or more preloading operations causes the fourth client device to be in a state of readiness to establish a private one-on-one video chat; and based at least in part on the state of the fourth client device indicating that the fourth client device is ready to establish the private one-on-one video chat, establishing a second private one-on-one video chat between the first client device and the fourth client device after the first private one-on-one video chat ends by (i) causing transmission of the first audiovisual stream to the fourth client device and (ii) simultaneously causing transmission of a fourth audiovisual stream from the fourth client device to the first client device.

8. The computer-implemented method of claim 7, wherein the request to the third device is a first request, and wherein the computer-implemented method further comprises:

during the second private one-on-one video chat, transmitting, by the backend server, a second request to the third client device to establish a data connection between the backend server and the third client device;

after establishing the data connection between the backend server and the third client device, receiving, at the backend server, a message from the third client device indicative of a state of the third client device; and based at least in part on the state of the third client device indicating that the third client device is ready to establish the private one-on-one video chat, establishing a third private one-on-one video chat between the first client device and the third client device after the second private one-on-one video chat ends by (i) causing transmission of the first audiovisual stream to the third client device and (ii) simultaneously causing transmission of a third audiovisual stream from the third client device to the first client device.

9. The computer-implemented method of claim 7, wherein the request to the third device is a first request, and wherein the method further comprises:

during the second private one-on-one video chat, determining that the third client device is connected to a virtual waiting room associated with the virtual meet-and-greet;

transmitting, by the backend server, instructions to the third client device to perform one or more preloading operations, wherein successful performance of the one or more preloading operations causes the third client device to be in a state of readiness to establish the private one-on-one video chat;

determining that the third client device is ready to establish the private one-on-one video chat; and based at least in part on the state of the third client device indicating that the third client device is ready to establish the private one-on-one video chat, establishing a third private one-on-one video chat between the first client device and the third client device after the second private one-on-one video chat ends by (i) causing transmission of the first audiovisual stream to the third client device and (ii) simultaneously causing transmission of a third audiovisual stream from the third client device to the first client device.

10. The computer-implemented method of claim 7, wherein the backend server stores an initial order in which to connect at least the second, third, and fourth client devices to the first client device, and wherein determining that no response to the request was received from the third client device within the second duration of time causes the initial order to be modified by placing the third client device after the fourth client device.

11. The computer-implemented method of claim 7, further comprising:

based at least in part on the state of the fourth client device indicating that the fourth client device is connected to a virtual waiting room associated with the virtual meet-and-greet, transmitting, by the backend server, instructions to the fourth client device to perform one or more preloading operations, wherein successful performance of the one or more preloading operations causes the fourth client device to be in a state of readiness to establish the private one-on-one video chat.

12. The computer-implemented method of claim 7, wherein transmitting, by the backend server, the request to the third client device to establish the data connection between the backend server and the third client device comprises:

determining that a virtual meet-and-greet software application is not running on the third client device; and based on determining that the virtual meet-and-greet software application is not running on the third client device, transmitting a push notification to the third client device, wherein interacting with the push notification causes the third client device to launch the virtual meet-and-greet software application.

13. The computer-implemented method of claim 12, wherein determining that no response to the request was received from the third client device within a second duration of time comprises:

determining that, after the second duration of time has elapsed, the third client device has not launched the virtual meet-and-greet software application;

determining that a virtual meet-and-greet software application is not running on the third client device; and based on determining that the virtual-meet-and-greet software application is not running on the third client device, transmitting a push notification to the third client device, wherein interacting with the push notification causes the third client device to launch the virtual-meet-and-greet software application.

14. A system for digitally engaging a celebrity with fans through virtual meetings, the system comprising:

a first client device associated with the celebrity that is operable to participate in a virtual meet-and-greet that involves a series of private one-on-one video chats with a set of fans, the first client device comprising at least a display, a camera, and a microphone;

one or more second client devices associated with the set of fans, each of the one or more second client devices being operable to participate in one of the private one-on-one video chats with the celebrity during the virtual meet-and-greet, each of the private one-on-one video chats being non-overlapping and occurring substantially sequentially, the one or more second client devices each comprising at least a display, a camera, and a microphone; and a backend server configured to facilitate the virtual meet-and-greet between the celebrity and the set of fans by:

(i) determining an initial order for the set of fans to participate in the virtual meet-and-greet;

(ii) establishing a private one-on-one video chat between the first client device and a respective second client device associated with a first fan of the set of fans based on the initial order;

(iii) before the end of the current private one-on-one video chat, transmitting instructions to a respective second client device associated with a next fan from the set of fans based on the initial order to perform one or more preloading operations to verify that the respective second client device of the next fan is ready to establish a private one-on-one video chat;

(a) if the respective second client device associated with the next fan successfully performed the one or more preloading operations, establishing a private one-on-one video chat between the first client device and the respective second client device;

(b) if the respective second client device associated with the next fan did not successfully perform the one or more preloading operations, modifying the initial order by moving the next fan to a later position and repeat step (iii) with a fan following the next fan in the modified initial order.

15. The system of claim 14, wherein the backend server is further configured to provide, during the virtual meet-and-greet, a virtual waiting room into which some of the one or more second client devices connect before establishing the private one-on-one video chat with the first client device, and wherein the one or more second client devices are further configured to display one or more user interface elements representative of a waiting room while connected to the virtual waiting room.

16. The system of claim 15, wherein the one or more user interface elements comprises a countdown timer that estimates the amount of time before establishing the private one-on-one video chat with the first client device, based in part on the initial order.

17. The system of claim 15, wherein the one or more user interface elements includes a representation of a number of fans ahead of the respective fan associated with the respective second client device.

18. The system of claim 15, wherein the backend server is further configured to provide, within the virtual waiting room, a chat box with which each of the one or more second client devices connected to the virtual waiting room can enter text chat viewable by the other one or more second client devices.

19. The system of claim 15, wherein the backend server is further configured to provide, within the virtual waiting room, a virtual button that, when pressed, causes the respective second client device to perform at least one of the one or more preloading operations to verify that the respective second client device is ready to establish a private one-on-one video chat.

* * * * *